US012666196B2

(12) United States Patent
Yamamoto

(10) Patent No.: US 12,666,196 B2
(45) Date of Patent: Jun. 23, 2026

(54) ULTRASONIC TRANSDUCER AND PARAMETRIC SPEAKER INCLUDING THE SAME

(71) Applicant: Murata Manufacturing Co., Ltd., Nagaokakyo (JP)

(72) Inventor: Hironari Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 175 days.

(21) Appl. No.: 18/768,282

(22) Filed: Jul. 10, 2024

(65) Prior Publication Data

US 2024/0365051 A1 Oct. 31, 2024

Related U.S. Application Data

(63) Continuation of application No. PCT/JP2023/038310, filed on Oct. 24, 2023.

(30) Foreign Application Priority Data

Jan. 25, 2023 (JP) ................................ 2023-009121

(51) Int. Cl.
*H04R 1/28* (2006.01)

(52) U.S. Cl.
CPC ................................ *H04R 1/2811* (2013.01)

(58) Field of Classification Search
CPC .................................................. H04R 1/2811
See application file for complete search history.

(56) References Cited

U.S. PATENT DOCUMENTS

2013/0072796 A1* 3/2013 Nakamura ........... A61B 8/4281 600/443
2013/0307633 A1* 11/2013 Onishi .................. H04R 17/00 331/155
2019/0081711 A1* 3/2019 Yoshida ............ H01Q 21/0006

FOREIGN PATENT DOCUMENTS

JP 2003047085 A 2/2003
JP 2003047985 A * 2/2003 ............... H04R 1/32
JP 6333480 B1 5/2018
(Continued)

OTHER PUBLICATIONS

International Search Report in PCT/JP2023/038310, mailed Jan. 16, 2024, 3 pages.

(Continued)

*Primary Examiner* — Devona E Faulk
(74) *Attorney, Agent, or Firm* — Keating & Bennett, LLP

(57) ABSTRACT

An ultrasonic transducer includes a diaphragm, one or more frame bodies extending in a longitudinal direction and bonded to the diaphragm, and one or more ultrasonic vibrators attached to the respective one or more frame bodies and facing the diaphragm with a space in between. The diaphragm is structured to resonate and vibrate in a direction orthogonal to the diaphragm in a phase opposite to a phase of the one or more ultrasonic vibrators. A dimension in the longitudinal direction inside the one or more frame bodies is larger than a dimension in a lateral direction orthogonal to the longitudinal direction inside the one or more frame bodies. One or more cavities cause an external space on an opposite side from the one or more frame bodies with respect to the diaphragm and an internal space inside the one or more frame bodies to communicate with each other.

20 Claims, 25 Drawing Sheets

(56) References Cited

FOREIGN PATENT DOCUMENTS

| | | | |
|---|---|---|---|
| JP | 2020068482 | A | 4/2020 |
| WO | 2012090383 | A1 | 7/2012 |

OTHER PUBLICATIONS

Written Opinion in PCT/JP2023/038310, mailed Jan. 16, 2024, 5 pages.

* cited by examiner

ULTRASONIC TRANSDUCER AND PARAMETRIC SPEAKER INCLUDING THE SAME

CROSS REFERENCE TO RELATED APPLICATIONS

This application claims the benefit of priority to Japanese Patent Application No. 2023-009121 filed on Jan. 25, 2023 and is a Continuation Application of PCT Application No. PCT/JP2023/038310 filed on Oct. 24, 2023. The entire contents of each application are hereby incorporated herein by reference.

BACKGROUND OF THE INVENTION

1. Field of the Invention

The present invention relates to ultrasonic transducers and parametric speakers including the ultrasonic transducers.

2. Description of the Related Art

Japanese Unexamined Patent Application Publication No. 2003-47085 and Japanese Patent No. 6333480 are related art documents each disclosing a configuration of a super-directive acoustic device. The super-directive acoustic device described in Japanese Unexamined Patent Application Publication No. 2003-47085 is configured by laying out a plurality of ultrasonic vibrators on one printed circuit board and arranging the ultrasonic vibrators so that an outer periphery thereof has a substantially circular shape. The plurality of ultrasonic vibrators are divided into two groups having different installation heights.

The super-directive acoustic device described in Japanese Patent No. 6333480 includes a first ultrasonic emitter and a second ultrasonic emitter. The second ultrasonic emitter is arranged on an axial center and in front of a radiation surface of the first ultrasonic emitter. A phase of a carrier signal emitted by the second ultrasonic emitter is opposite to a phase of a carrier signal contained in a signal emitted by the first ultrasonic emitter.

SUMMARY OF THE INVENTION

In the super-directive acoustic device described in Japanese Unexamined Patent Application Publication No. 2003-47085, the plurality of ultrasonic vibrators are arranged in two groups having different installation heights, and thus the configuration is complicated. In the super-directive acoustic device described in Japanese Patent No. 6333480, the second ultrasonic emitter is arranged outside the first ultrasonic emitter, and thus the device is increased in size.

Example embodiments of the present invention provide ultrasonic transducers capable of increasing a sound pressure level while reducing internal stress with a simple and compact configuration, and parametric speakers including the ultrasonic transducers.

An ultrasonic transducer according to an example embodiment of the present invention includes a first diaphragm, one or more frame bodies, and one or more ultrasonic vibrators. The one or more frame bodies extend in a longitudinal direction and are bonded to the first diaphragm. The one or more ultrasonic vibrators are attached to the respective one or more frame bodies and face the first diaphragm with a space in between. The first diaphragm is structured to resonate and vibrate in a direction orthogonal to the first diaphragm in a phase opposite to a phase of the one or more ultrasonic vibrators. A dimension in the longitudinal direction inside the one or more frame bodies is larger than a dimension in a lateral direction orthogonal to the longitudinal direction inside the one or more frame bodies. The ultrasonic transducer is provided with one or more cavities that cause an external space on an opposite side from the one or more frame bodies with respect to the first diaphragm and an internal space inside the one or more frame bodies to communicate with each other.

According to example embodiments of the present invention, it is possible to increase a sound pressure level while reducing internal stress with a simple and compact configuration in ultrasonic transducers.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
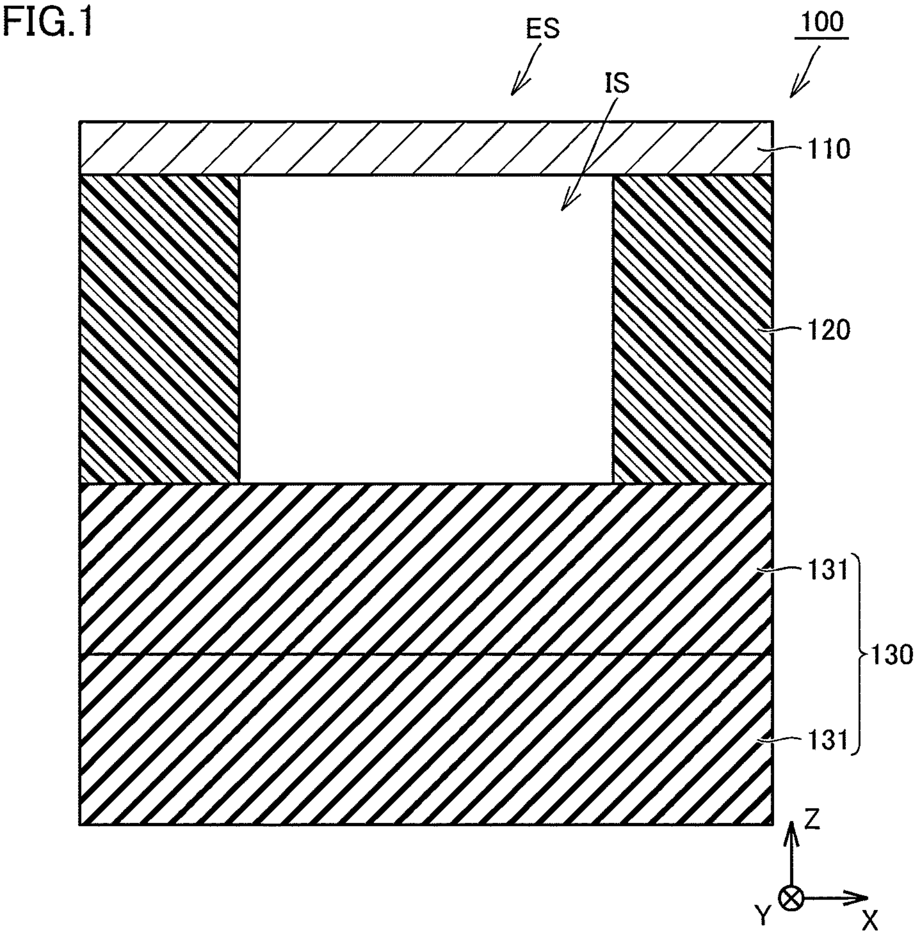
FIG. 1 is a longitudinal sectional view illustrating a configuration of an ultrasonic transducer according to Example Embodiment 1 of the present invention.

Hereinafter, an ultrasonic transducer according to each example embodiment of the present invention will be described with reference to the drawings. In the following description of the example embodiments, the same or corresponding elements or features in the drawings are denoted by the same reference numerals, and the description thereof will not be repeated. Example embodiments of the invention present are applicable to applications requiring high-sound-pressure ultrasonic waves, such as ultrasonic transducers for parametric speakers, ultrasonic sensors, or non-contact haptics. In the following example embodiments, ultrasonic transducers for parametric speakers will be described as examples, but the use of the ultrasonic transducers is not limited thereto.

Example Embodiment 1

Figure 2:
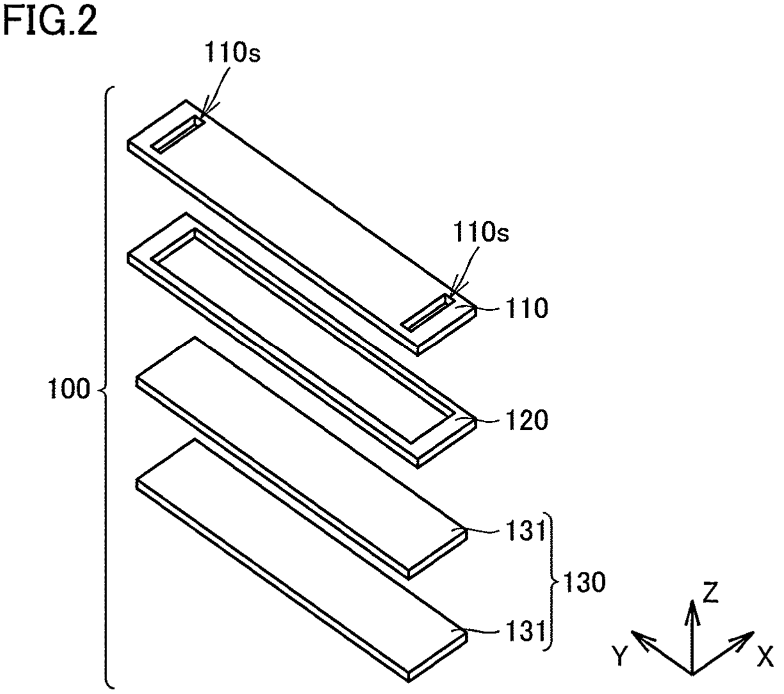
FIG. 2 is an exploded perspective view illustrating the configuration of the ultrasonic transducer according to Example Embodiment 1 of the present invention.

FIG. 1 is a longitudinal sectional view illustrating a configuration of an ultrasonic transducer according to Example Embodiment 1 of the present invention. FIG. 2 is an exploded perspective view illustrating the configuration of the ultrasonic transducer according to Example Embodiment 1 of the present invention. As illustrated in FIG. 1 and FIG. 2, an ultrasonic transducer 100 according to Example Embodiment 1 of the present invention includes a first diaphragm 110, a frame body 120, and an ultrasonic vibrator 130.

The first diaphragm 110 has a flat plate shape. The first diaphragm 110 is made of an aluminum alloy such as duralumin containing aluminum, or metal such as stainless steel. In the present example embodiment, the first diaphragm 110 is made of stainless steel. A thickness of the first diaphragm 110 is, for example, equal to or greater than about 0.1 mm and equal to or less than about 0.2 mm.

The frame body 120 has a rectangular or substantially rectangular annular shape. The frame body 120 has a lateral direction along a first direction (X-axis direction) and a longitudinal direction along a second direction (Y-axis direction). The frame body 120 extends in the second direction (Y-axis direction). An axial direction of the frame body 120 is aligned with a third direction (Z-axis direction). One end of the frame body 120 in the third direction (Z-axis direction) is bonded to the first diaphragm 110 by a bonding agent made of an epoxy resin or the like.

The frame body 120 is made of an aluminum alloy or metal such as stainless steel, glass epoxy, resin, or the like. From a viewpoint of reducing or preventing a change in characteristics of the ultrasonic transducer 100 due to a change in temperature, the frame body 120 is preferably made of metal. On the other hand, from a viewpoint of lowering a frequency of ultrasonic waves transmitted or received by the ultrasonic transducer 100, and from a viewpoint of miniaturizing the ultrasonic transducer 100, the frame body 120 is preferably made of resin. In the present example embodiment, the frame body 120 is made of stainless steel. A thickness of the frame body 120 is, for example, equal to or greater than about 0.2 mm and equal to or less than about 0.8 mm.

Figure 3:
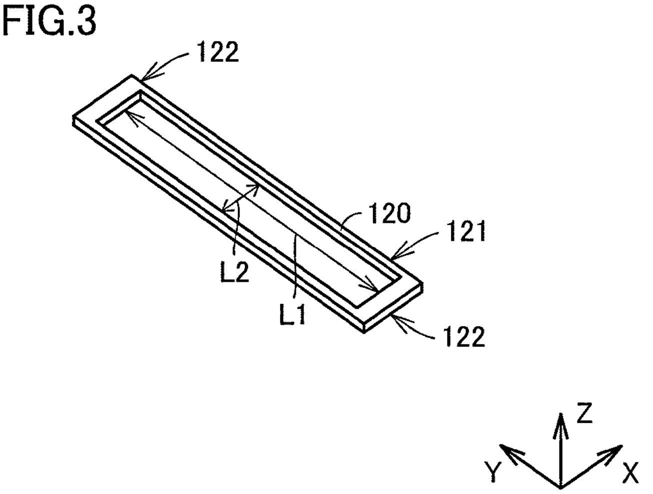
FIG. 3 is a perspective view illustrating a configuration of a frame body included in the ultrasonic transducer according to Example Embodiment 1 of the present invention.

FIG. 3 a perspective view illustrating a configuration of frame body included in the ultrasonic transducer according to Example Embodiment 1 of the present invention. As illustrated in FIG. 3, the frame body 120 has a pair of long side portions 121 extending in the second direction (Y-axis direction) and a pair of short side portions 122 extending in the first direction (X-axis direction). An average interval between the short side portions 122 is equal to or greater than four times a shortest interval between the long side portions 121. That is, a longitudinal dimension L1 in the second direction (Y-axis direction) inside the frame body 120 is equal to or greater than four times a short dimension L2 in the first direction (X-axis direction) inside the frame body 120.

Note that a corner portion interposed between the long side portion 121 and the short side portion 122 may be chamfered. Further, the short side portion 122 is not limited to be in a linear shape when viewed in the third direction (Z-axis direction), and may have an arc shape that is convex toward an inside of the frame body 120 or an arc shape that is convex toward an outside of the frame body 120.

A resonant frequency of the first diaphragm 110 can be adjusted by changing the short dimension L2 in the first direction (X-axis direction) inside the frame body 120. For example, when the resonant frequency of the first diaphragm 110 is set to be equal to or higher than about 100 kHz, the short dimension L2 is equal to or greater than about 1.5 mm and equal to or less than about 3 mm.

The longitudinal dimension L1 in the second direction (Y-axis direction) inside the frame body 120 is greater than the short dimension L2, and from a viewpoint of increasing a sound pressure level of ultrasonic waves transmitted by the ultrasonic transducer 100, the longitudinal dimension L1 is, for example, equal to or greater than about 20 mm.

Figure 4:
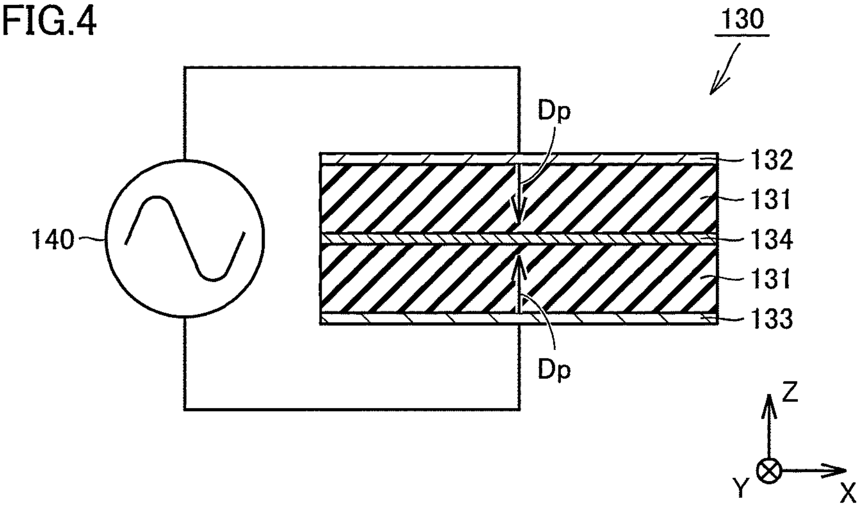
FIG. 4 is a sectional view illustrating a configuration of an ultrasonic vibrator included in the ultrasonic transducer according to Example Embodiment 1 of the present invention.

FIG. 4 is a sectional view illustrating a configuration of the ultrasonic vibrator included in the ultrasonic transducer according to Example Embodiment 1 of the present invention. As illustrated in FIG. 1, the ultrasonic vibrator 130 is attached to the frame body 120 and faces the first diaphragm 110 with a space in between. Specifically, the ultrasonic vibrator 130 is attached to another end of the frame body 120 in the third direction (Z-axis direction), and faces the first diaphragm 110 with an internal space IS inside the frame body 120 in between.

The ultrasonic transducer 100 is provided with one or more cavities that cause an external space ES on an opposite side from the frame body 120 with respect to the first diaphragm 110 and an internal space IS inside the frame body 120 to communicate with each other. In the present example embodiment, as illustrated in FIG. 2, two cavities are formed in the first diaphragm 110. Note that the cavity is not limited to be formed in the first diaphragm 110, and a portion where the first diaphragm 110 does not cover a part of an inside of the frame body 120 may be formed as a cavity by making a dimension of the first diaphragm 110 in the second direction (Y-axis direction) smaller than the longitudinal dimension L1 in the second direction (Y-axis direction) inside the frame body 120.

Each of the two cavities includes a slit 110*s* extending in the first direction (X-axis direction). Each of the two slits 110*s* extends to be equal to or longer than the short dimension L2 in the first direction (X-axis direction) inside the frame body 120. In the present example embodiment, a length dimension of the slit 110*s* in the first direction (X-axis direction) is the same as the short dimension L2 in the first direction (X-axis direction) inside the frame body 120. A width dimension of the slit 110*s* in the second direction (Y-axis direction) is equal to or greater than about 0.4 mm and equal to or less than about 0.6 mm, for example. The slit 110*s* extends from a position at an edge in the second direction (Y-axis direction) on an inner circumferential surface of the frame body 120 to a position inward by the width dimension in the second direction (Y-axis direction). The two slits 110*s* are open at both the respective end portions in the second direction (Y-axis direction) inside the frame body 120.

As illustrated in FIG. 1, FIG. 2 and FIG. 4, the ultrasonic vibrator 130 is a piezoelectric element including a piezoelectric body 131. As illustrated in FIG. 4, in the present example embodiment, the ultrasonic vibrator 130 includes two stacked piezoelectric bodies 131. Polarization directions Dp of the two piezoelectric bodies 131 are different from each other. Specifically, the polarization directions Dp of the two piezoelectric bodies 131 face each other in the third direction (Z-axis direction). The two piezoelectric bodies 131 are sandwiched between a first electrode 132 and a second electrode 133, and an intermediate electrode 134 is arranged between the two piezoelectric bodies 131. The first electrode 132 and the second electrode 133 are electrically connected to a processing circuit 140 capable of applying an AC voltage. The ultrasonic vibrator 130 is a so-called series-type bimorph-type piezoelectric vibrator. A total of thicknesses of the two piezoelectric bodies 131 is, for example, equal to or greater than about 0.5 mm and equal to or less than about 0.85 mm.

Figure 5:
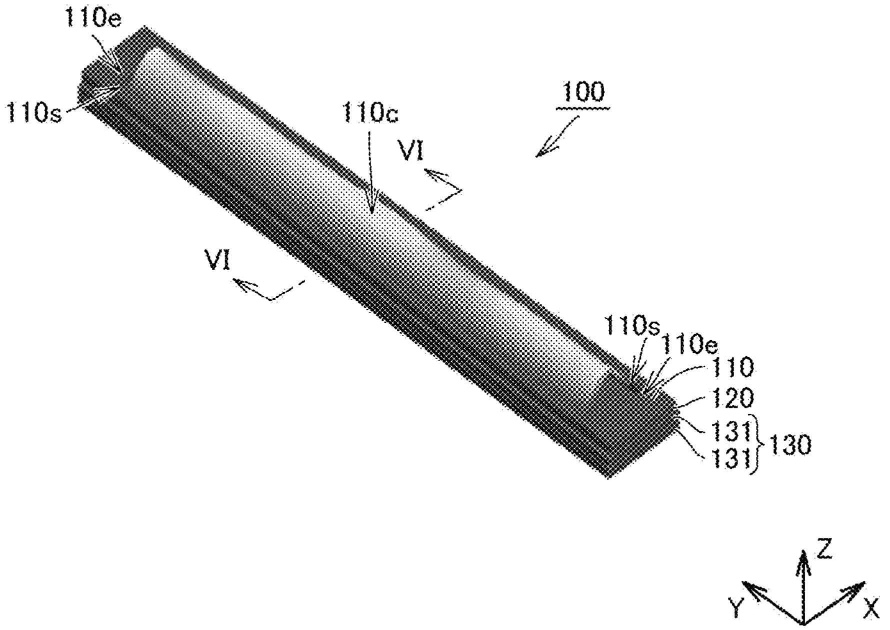
FIG. 5 is a perspective view showing a displacement state obtained by a simulation analysis using a finite element method when the ultrasonic transducer according to Example Embodiment 1 of the present invention is transmitting or receiving ultrasonic waves.
Figure 6:
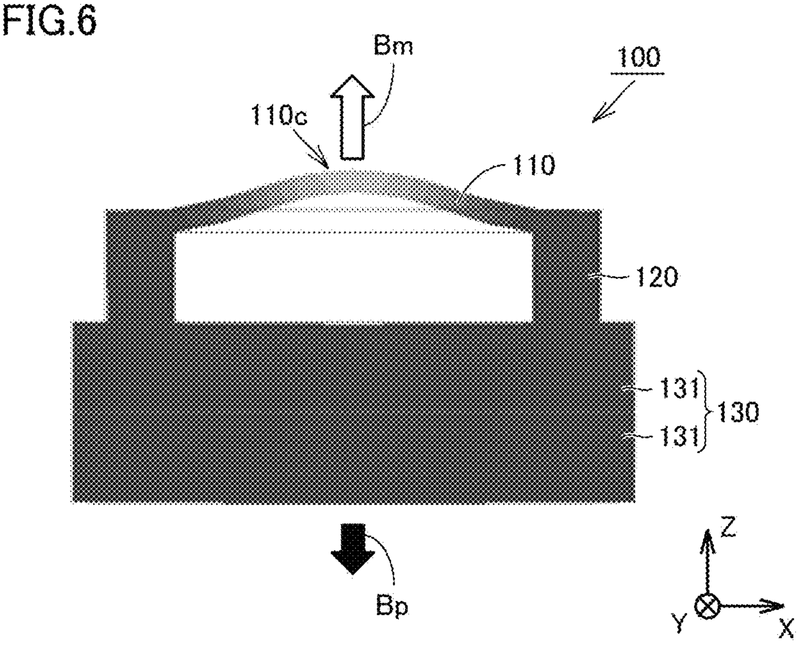
FIG. 6 is a sectional view of the ultrasonic transducer of FIG. 5 taken along line VI-VI as viewed in a direction of arrows.

FIG. 5 is a perspective view showing a displacement state obtained by a simulation analysis using a finite element method when the ultrasonic transducer according to Example Embodiment 1 of the present invention is transmitting or receiving ultrasonic waves. FIG. 6 is a sectional view of the ultrasonic transducer of FIG. 5 taken along line VI-VI as viewed in a direction of arrows. As simulation analysis conditions, the thickness of the first diaphragm 110 was about 0.1 mm, the total thickness of the two piezoelectric bodies 131 was about 0.8 mm, the longitudinal dimension L1 inside the frame body 120 was about 20 mm, the short dimension L2 inside the frame body 120 was about 2 mm, and the thickness of the frame body 120 in the third direction (Z-axis direction) was about 0.4 mm. Each of the two slits 110*s* having the length dimension of about 20 mm extends from a position at the edge of the inner circumferential surface of the frame body 120 in the second direction (Y-axis direction) to a position inward by about 0.5 mm in the second direction (Y-axis direction), for example. That is, the width dimension of each of the two slits 110*s* was set to about 0.5 mm, for example.

As illustrated in FIG. 5 and FIG. 6, in a vibration mode of the ultrasonic transducer 100 according to Example Embodiment 1 of the present invention, the first diaphragm 110 is structured to resonate and vibrate in a phase opposite to that of the ultrasonic vibrator 130 in the third direction (Z-axis direction) orthogonal to the first diaphragm 110. That is, as illustrated in FIG. 6, a displacement direction of a resonant vibration Bm of the first diaphragm 110, and a displacement direction of a resonant vibration Bp of the ultrasonic vibrator 130 are opposite to each other in the third direction (Z-axis direction). In the present example embodiment, the resonant frequency of the first diaphragm 110 and a resonant frequency of the ultrasonic vibrator 130 are equal to or higher than about 100 KHz.

A portion of the first diaphragm 110 positioned above the internal space IS inside the frame body 120 and positioned between the slits 110*s* in the second direction (Y-axis direction) is a vibrating region that is structured to resonate and vibrate. A longitudinal dimension of the vibrating region of the first diaphragm 110 is a dimension between the slits 110*s*, and a short dimension of the vibrating region of the first diaphragm 110 is equal to the short dimension L2 inside the frame body 120. In the first diaphragm 110, an intermediate portion 110*c* positioned at a middle in the longitudinal direction inside the frame body 120 is largely displaced, and end portions 110*e* positioned outside the slits 110*s* in the second direction (Y-axis direction) are almost unlikely to be displaced.

Here, a relationship between the resonant frequency of the first diaphragm 110 and the longitudinal dimension L1 inside the frame body 120 will be described.

Figure 7:
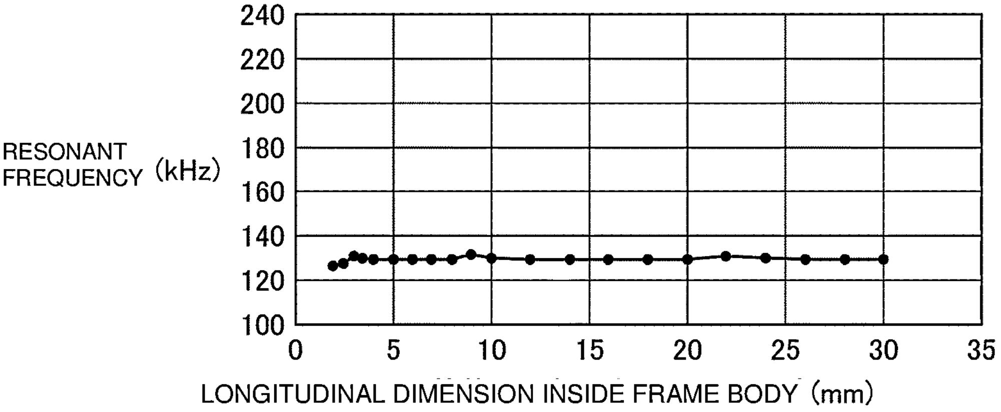
FIG. 7 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 1 of the present invention.

FIG. 7 is a graph obtained by a simulation analysis, using a finite element method, of a transition of the resonant frequency of the first diaphragm when the longitudinal dimension is changed while the short dimension is fixed inside the frame body in the ultrasonic transducer according to Example Embodiment 1 of the present invention. In FIG. 7, a vertical axis represents the resonant frequency (kHz) of the first diaphragm 110, and a horizontal axis represents the longitudinal dimension L1 (mm) inside the frame body 120. As a simulation analysis condition, the short dimension L2 inside the frame body 120 was fixed to about 2 mm, for example.

As shown in FIG. 7, the resonant frequencies of the first diaphragm 110 and the ultrasonic vibrator 130 were substantially constant at 130 kHz regardless of the change in the longitudinal dimension L1 inside the frame body 120. That is, the resonant frequency of the first diaphragm 110 is determined by acoustic velocity in the first diaphragm 110 and reflection of vibration with the frame body 120 as fixed ends, but an influence of the short dimension L2 becomes dominant with respect to the reflection of vibration regardless of the longitudinal dimension L1 inside the frame body 120, and the state of reflection of vibration does not change even when the longitudinal dimension L1 becomes larger.

Next, a result of a simulation analysis, using a finite element method, about a relationship between sound pressure of an ultrasonic wave transmitted from the ultrasonic transducer 100 and the longitudinal dimension L1 inside the frame body 120 will be described.

Figure 8:
FIG. 8 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 1 of the present invention.

FIG. 8 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 1 of the present invention. In FIG. 8, a vertical axis represents the sound pressure (Pa) transmitted from the ultrasonic transducer 100, and a horizontal axis represents the longitudinal dimension L1 (mm) inside the frame body 120. As a simulation analysis condition, the short dimension L2 inside the frame body 120 was fixed to about 2 mm, for example, and the sound pressure (Pa) at a position separated by about 30 cm, for example, in the third direction (Z-axis direction) from the first diaphragm 110 in front of the ultrasonic transducer 100 was calculated.

As shown in FIG. 8, the sound pressure of the ultrasonic wave transmitted from the ultrasonic transducer 100 was increased as the longitudinal dimension L1 inside the frame body 120 was increased. This means that even when the longitudinal dimension of the vibrating region of the first diaphragm 110 is increased, an entirety of the vibrating region of the first diaphragm 110 between the slits 110*s* vibrates. That is, an area of the vibrating region can be increased by an increment corresponding to an increased length of the vibrating region of the first diaphragm 110, and as a result, a change in pressure of the air due to the vibration of the first diaphragm 110 can be increased to obtain a high sound pressure.

As described above, in the ultrasonic transducer 100 according to the present example embodiment, the sound pressure can be increased while maintaining the resonant frequency substantially constant by increasing the longitudinal dimension of the vibrating region of the first diaphragm 110. In addition, since there are node points at respective end portions in the longitudinal direction, both the end portions can be supported or fixed, and thus the ultrasonic transducer 100 can be easily mounted.

Here, an ultrasonic element array according to a first comparative example in which a high sound pressure is obtained by arranging high-frequency ultrasonic elements side by side will be described.

Figure 9:
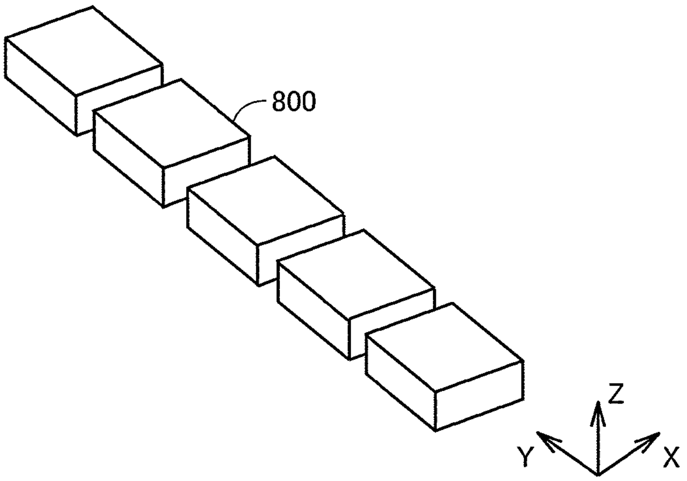
FIG. 9 is a perspective view illustrating a configuration of an ultrasonic element array according to a first comparative example.

FIG. 9 is a perspective view illustrating a configuration of the ultrasonic element array according to the first comparative example. As illustrated in FIG. 9, in the ultrasonic element array according to the first comparative example, a plurality of ultrasonic elements 800 are arranged such that the elements are aligned in the second direction (Y-axis direction) at intervals. In such an ultrasonic element array, since a space in which a sound pressure is not generated exists between the ultrasonic elements 800, which reduces efficiency. Further, for example, since the ultrasonic element 800 of a high frequency equal to or higher than 100 kHz is small in size, it takes time and effort to configure the ultrasonic element array by mounting the plurality of aligned ultrasonic elements 800.

Hereinafter, the thickness of the first diaphragm 110 included in the ultrasonic transducer 100 according to an example embodiment of the present invention will be described in detail.

The first diaphragm 110 and the ultrasonic vibrator 130 resonate and vibrate in phases opposite to each other, and are in a vibration mode like a tuning fork vibration. From a viewpoint of maintaining physical balance between the first diaphragm 110 and the ultrasonic vibrator 130, it is preferable that a relationship of $0.7CpTp/Cv \leq Tv \leq 1.3CpTp/Cv$ be satisfied, where Cv is an acoustic velocity of a transverse wave of the first diaphragm 110, Cp is an acoustic velocity of a transverse wave of the piezoelectric body 131, Tv is a thickness dimension of the first diaphragm 110, and Tp is a thickness dimension of the piezoelectric body 131. The acoustic velocity Cv of the transverse wave of the first diaphragm 110 is determined by a material of the first diaphragm 110. The acoustic velocity Cp of the transverse wave of the piezoelectric body 131 is determined by a material of the piezoelectric body 131. When there are a plurality of the stacked piezoelectric bodies 131 in the ultrasonic vibrator 130, the thickness dimension Tp of the piezoelectric bodies 131 is a total value of a thickness of each of the plurality of piezoelectric bodies 131.

By satisfying the relationship of $0.7CpTp/Cv \leq Tv \leq 1.3CpTp/Cv$, it is possible to reduce or prevent vibration leakage while maintaining the physical balance between the first diaphragm 110 and the ultrasonic vibrator 130 during vibration, and increasing amplitude of the resonant vibration of the first diaphragm 110 to increase the sound pressure. Note that it is more preferable that a relationship of $Tv=CpTp/Cv$ be satisfied. From a viewpoint of maintaining the physical balance, when Tp=about 0.8, it is ideal that the thickness dimension Tv of the first diaphragm 110 is about 0.4 from a relational equation of Tv=about 0.8 Cp/Cv, for example.

Figure 10:
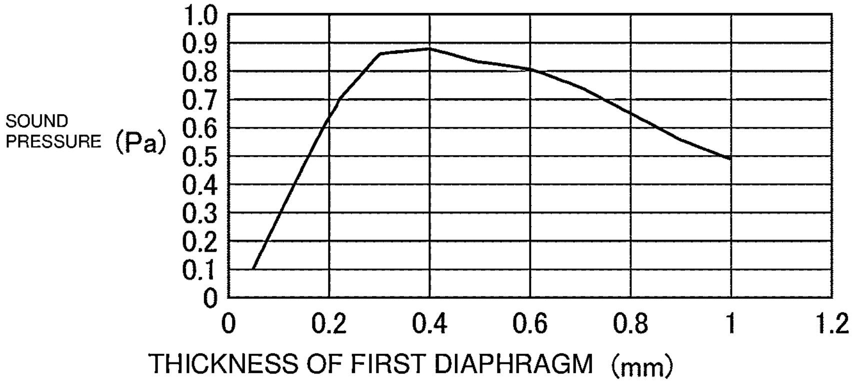
FIG. 10 is a graph obtained by a simulation analysis, using a finite element method, about a relationship between the sound pressure of the ultrasonic waves transmitted from the ultrasonic transducer and thickness of the first diaphragm.

FIG. 10 is a graph obtained by a simulation analysis, using a finite element method, about a relationship between the sound pressure of the ultrasonic wave transmitted from the ultrasonic transducer, and the thickness of the first diaphragm. In FIG. 10, a vertical axis represents the sound pressure (Pa) transmitted from the ultrasonic transducer 100, and a horizontal axis represents the thickness (mm) of the first diaphragm. As a simulation analysis condition, the total value Tp of the thicknesses of the two piezoelectric bodies 131 was about 0.8 mm, for example. As shown in FIG. 10, when the thickness of the first diaphragm 110 was about 0.4 mm, for example the sound pressure of the ultrasonic wave transmitted from the ultrasonic transducer was maximized.

Figure 11:
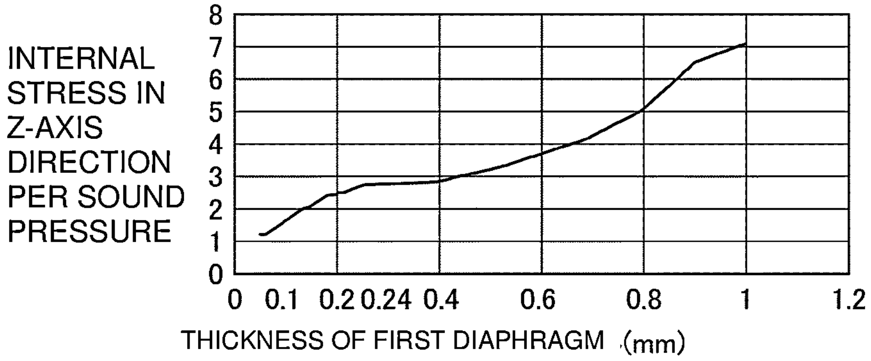
FIG. 11 is a graph obtained by a simulation analysis, finite element method, about a relationship between using a internal stress (value normalized per sound pressure) in a third direction (Z-axis direction) generated in the ultrasonic transducer and the thicknesses of the first diaphragm.

FIG. 11 is a graph obtained by a simulation analysis, using a finite element method, about a relationship between internal stress (value normalized per sound pressure) in the third direction (Z-axis direction) generated in the ultrasonic transducer and the thicknesses of the first diaphragm. In FIG. 11, a vertical axis represents the internal stress in the third direction (Z-axis direction) per sound pressure, and a horizontal axis represents the thickness (mm) of the first diaphragm.

As shown in FIG. 11, as the thickness of the first diaphragm 110 was decreased, the internal stress (value normalized per sound pressure) in the third direction (Z-axis direction) generated in the ultrasonic transducer 100 was decreased. In particular, when the thickness of the first diaphragm 110 was equal to or less than about 0.24 mm, the internal stress (value normalized per sound pressure) in the third direction (Z-axis direction) generated in the ultrasonic transducer 100 was significantly decreased. By decreasing the internal stress (value normalized per sound pressure) in the third direction (Z-axis direction) generated in the ultrasonic transducer 100, it is possible to reduce or prevent generation of cracks due to the internal stress in each of a bonding portion between the first diaphragm 110 and the frame body 120 and a bonding portion between the frame body 120 and the ultrasonic vibrator 130. On the other hand, when the thickness of the first diaphragm 110 is less than about 0.1 mm, the first diaphragm 110 is too soft and is not suitable as a vibrating body that oscillates ultrasonic waves.

That is, from a viewpoint of generating high-sound-pressure ultrasonic waves while reducing or preventing occurrence of cracks due to the internal stress, it is preferable that a relationship of $0.25CpTp/Cv \leq Tv \leq 0.6CpTp/Cv$ be satisfied. In the present example embodiment, the thickness of the first diaphragm 110 is equal to or greater than about 0.1 mm and equal to or less than about 0.2 mm, and thus the ultrasonic transducer 100 can be driven in a state in which the internal stress (value normalized per sound pressure) in the third direction (Z-axis direction) generated in the ultrasonic transducer 100 is decreased.

Here, results of a simulation analysis using a finite element method for driving efficiency of the ultrasonic transducer in a case where the ultrasonic vibrator is a bimorph-type piezoelectric vibrator and in a case where the ultrasonic vibrator is a unimorph-type piezoelectric vibrator will be described. In order to match simulation analysis conditions with the conditions for the bimorph-type ultrasonic vibrator 130 illustrated in FIG. 1, the unimorph-type ultrasonic vibrator also has a structure in which the two piezoelectric bodies 131 are bonded to each other as illustrated in FIG. 1, and a drive voltage is applied to the only one piezoelectric body 131 of the two, and another piezoelectric body 131 serves as a second diaphragm to which a drive voltage is not applied.

Specifically, in an ultrasonic transducer of a first modification, the piezoelectric body 131 adjacent to the frame body 120 is applied with a drive voltage, and the piezoelectric body 131 not adjacent to the frame body 120 serves as the second diaphragm to which no drive voltage is applied. In the first modification, the second diaphragm is provided on a side opposite to a frame body side of the piezoelectric body 131 to which the drive voltage is applied.

In an ultrasonic transducer of a second modification, the piezoelectric body 131 not adjacent to the frame body 120 is applied with a drive voltage, and the piezoelectric body 131 adjacent to the frame body 120 serves as the second diaphragm to which no drive voltage is applied. In the second modification, the second diaphragm is provided on the frame body side of the piezoelectric body 131 to which the drive voltage is applied.

Figure 12:
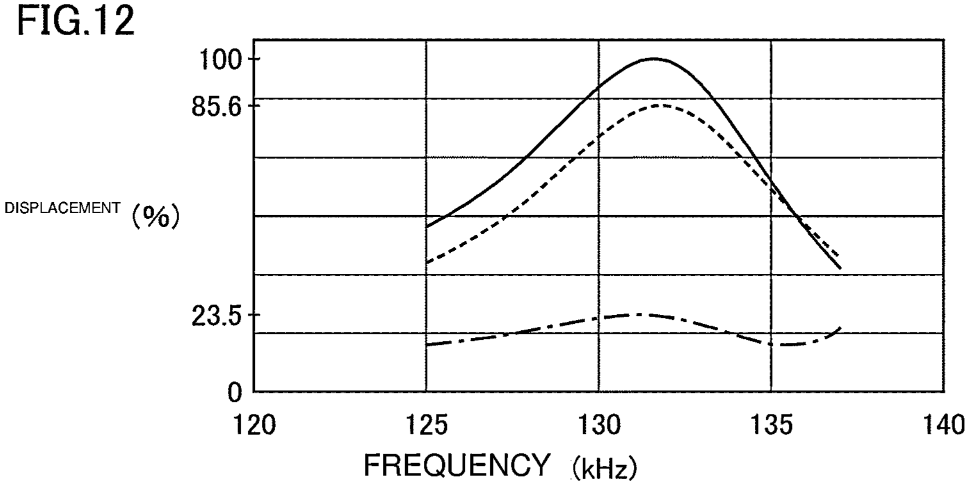
FIG. 12 is a graph obtained by a simulation analysis, using a finite element relationship between displacement of the first diaphragm and a frequency of the ultrasonic vibrator in each of the ultrasonic transducer according to the present example embodiment, an ultrasonic transducer according to a first modification, and an ultrasonic transducer according to a second modification.

FIG. 12 is a graph obtained by a simulation analysis, using a finite element method, about a relationship between displacement of the first diaphragm and a frequency of the ultrasonic vibrator in the ultrasonic transducer according to the present example embodiment, the ultrasonic transducer according to the first modification, and the ultrasonic transducer according to the second modification. In FIG. 12, a vertical axis represents the displacement of the first diaphragm 110, and a horizontal axis represents the frequency (kHz) of the ultrasonic vibrator 130. Data of the ultrasonic transducer 100 according to the present example embodiment is indicated by a solid line, data of the ultrasonic transducer according to the first modification is indicated by a dotted line, and data of the ultrasonic transducer according to the second modification is indicated by a dashed line.

As shown in FIG. 12, when the displacement of the first diaphragm 110 in the ultrasonic transducer 100 according to the present example embodiment was 100%, the displacement of the first diaphragm 110 of the ultrasonic transducer according to the first modification was about 85.68, and the displacement of the first diaphragm 110 of the ultrasonic transducer according to the second modification was about 23.5%, for example. When a free capacitance of the piezoelectric element in the ultrasonic transducer 100 according to the present example embodiment was 100%, a free capacitance of a piezoelectric element in the ultrasonic transducer according to the first modification was about 53.5%, and a free capacitance of a piezoelectric element in the ultrasonic transducer according to the second modification was about 60.5%, for example.

When the piezoelectric elements are driven at the same voltage, power consumption is smaller for a piezoelectric element with a smaller free capacitance. It was discovered that displacement of the first diaphragm 110 that can be performed by the ultrasonic transducer according to the first modification is nearly 80% of displacement by the ultrasonic transducer 100 according to the present example embodiment with power consumption of about half that of the ultrasonic transducer 100 according to the present example embodiment, which is efficient.

In the present example embodiment, the ultrasonic vibrator 130 is a so-called series type bimorph-type piezoelectric vibrator, but the ultrasonic vibrator 130 may be a piezoelectric vibrator of another type. Hereinafter, an ultrasonic vibrator of an ultrasonic transducer according to a modification of Example Embodiment 1 of the present invention will be described.

Figure 13:
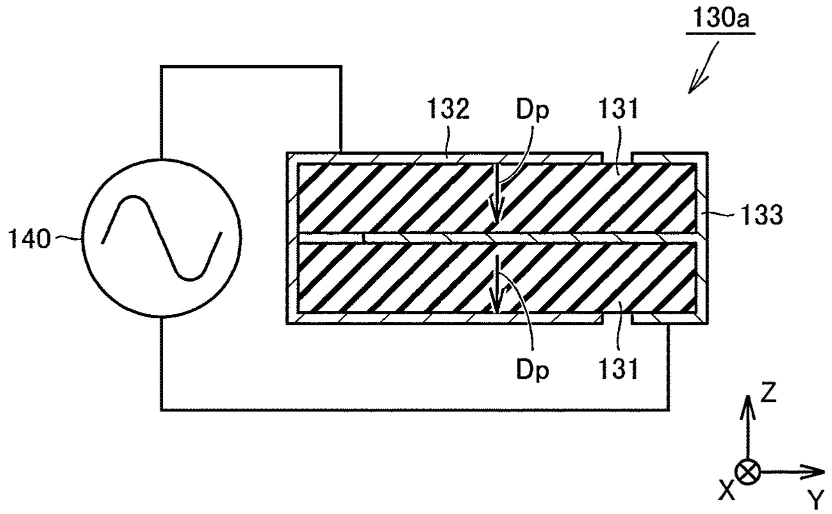
FIG. 13 is a sectional view illustrating a configuration of an ultrasonic vibrator according to a third modification.

FIG. 13 is a sectional view illustrating a configuration of an ultrasonic vibrator according to a third modification. As illustrated in FIG. 13, an ultrasonic vibrator 130*a* according to the third modification is a piezoelectric element including the two stacked piezoelectric bodies 131. The polarization directions Dp of the two piezoelectric bodies 131 are equal to each other. The ultrasonic vibrator 130*a* is a so-called parallel-type bimorph-type piezoelectric vibrator.

Figure 14:
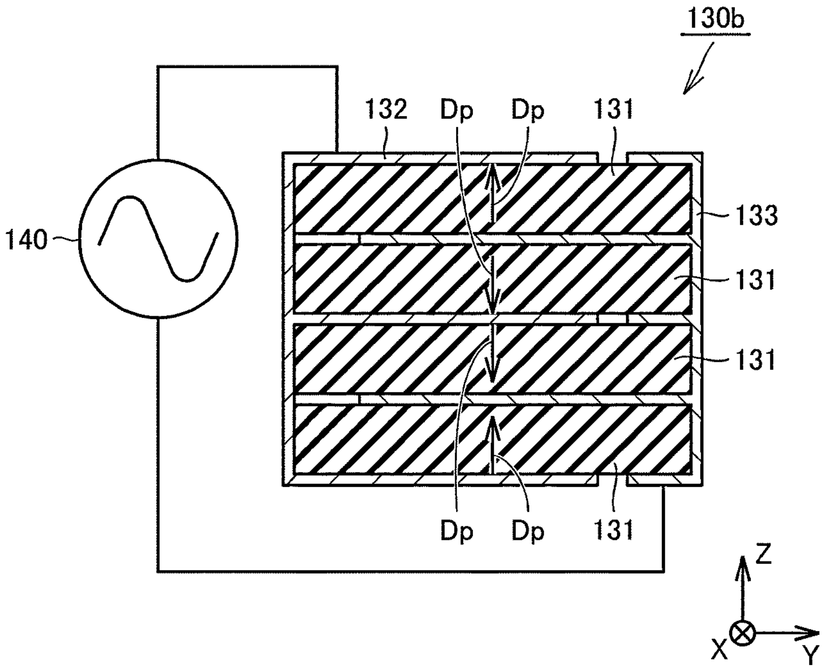
FIG. 14 is a sectional view illustrating a configuration of an ultrasonic vibrator according to a fourth modification.

FIG. 14 is a sectional view illustrating a configuration of an ultrasonic vibrator according to a fourth modification. As illustrated in FIG. 14, an ultrasonic vibrator 130*b* according to the fourth modification is a piezoelectric element including the four stacked piezoelectric bodies 131. The polarization directions Dp of the two piezoelectric bodies 131 positioned on outer sides among the four piezoelectric bodies 131 are oriented in one direction of the first direction (Z-axis direction), and the polarization directions Dp of the two piezoelectric bodies 131 positioned on inner sides among the four piezoelectric bodies 131 are oriented in another direction of the first direction (Z-axis direction). The ultrasonic vibrator 130*b* is a so-called multimorph-type piezoelectric vibrator.

Figure 15:
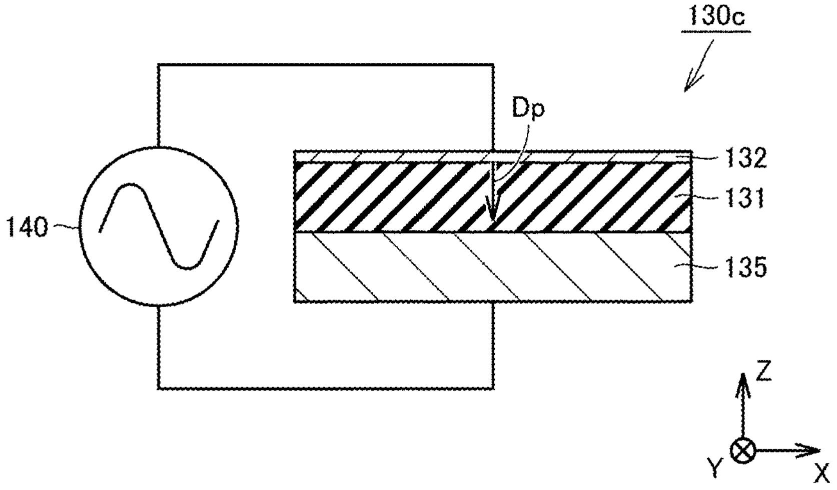
FIG. 15 is a sectional view illustrating a configuration of an ultrasonic vibrator according to a fifth modification.

FIG. 15 is a sectional view illustrating a configuration of an ultrasonic vibrator according to a fifth modification. As illustrated in FIG. 15, an ultrasonic vibrator 130*c* according to the fifth modification is a piezoelectric element including the one piezoelectric body 131. Specifically, the piezoelectric body 131 is sandwiched between the first electrode 132 and a second diaphragm 135 made of metal. The ultrasonic vibrator 130*c* is a so-called unimorph-type piezoelectric vibrator.

Figure 16:
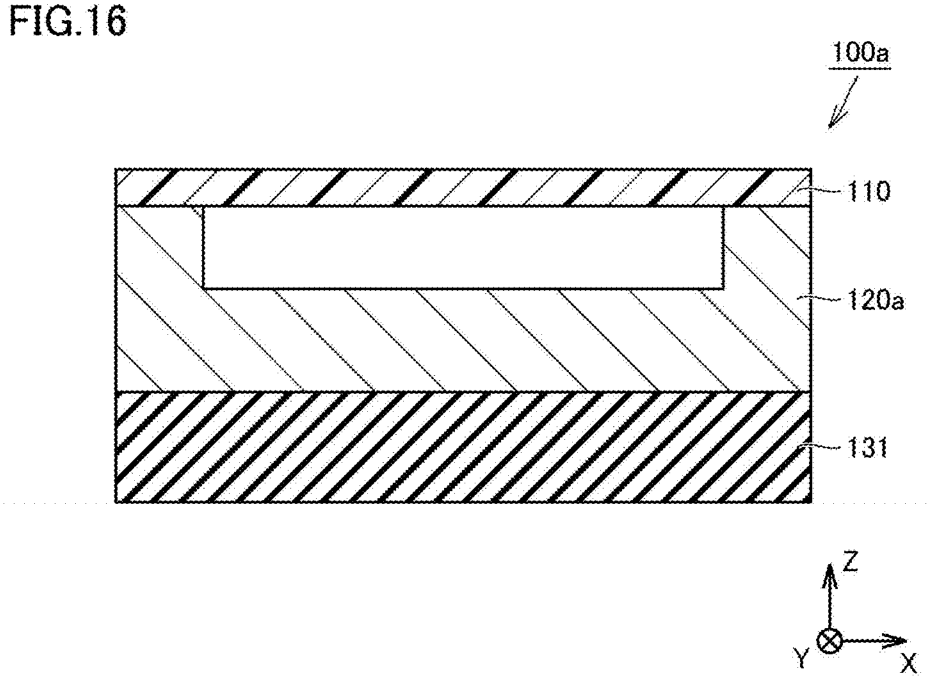
FIG. 16 is a longitudinal sectional view illustrating a configuration of an ultrasonic transducer according to a sixth modification of Example Embodiment 1 of the present invention.

FIG. 16 is a longitudinal sectional view illustrating a configuration of an ultrasonic transducer according to a sixth modification of Example Embodiment 1 of the present invention. As illustrated in FIG. 16, an ultrasonic transducer 100*a* according to the sixth modification of Example Embodiment 1 of the present invention includes the first diaphragm 110, a frame body 120*a* and the ultrasonic vibrator 130. The frame body 120*a* has a bottomed cylindrical shape. The frame body 120*a* is made of metal. The piezoelectric body 131 is affixed to an outer bottom surface of the frame body 120*a*, and an ultrasonic vibrator which is a unimorph-type piezoelectric vibrator is configured.

Figure 17:
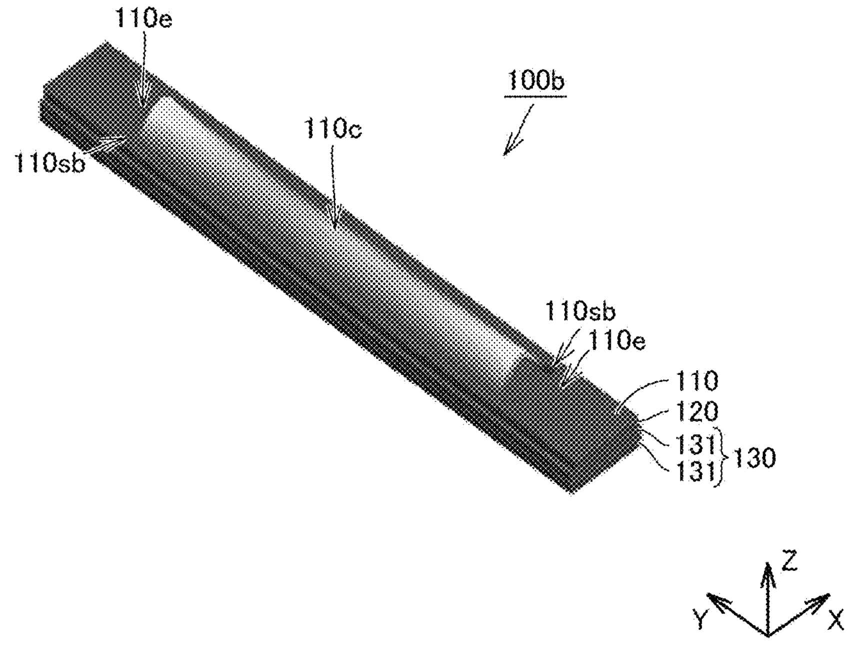
FIG. 17 is a perspective view showing a displacement state obtained by a simulation analysis using a finite element method when an ultrasonic transducer according to a seventh modification of Example Embodiment 1 of the present invention is transmitting or receiving ultrasonic waves, in which a formation position of each of two slits is shifted by about 2 mm toward a center in the longitudinal direction inside the frame body.

Here, a formation position of a slit and a size of the slit will be described in detail. FIG. 17 is a perspective view showing a displacement state obtained by a simulation analysis using a finite element method when an ultrasonic transducer according to a seventh modification of Example Embodiment 1 of the present invention is transmitting or receiving ultrasonic waves, in which a formation position of each of two slits is shifted by about 2 mm toward a center in the longitudinal direction inside the frame body, for example. In an ultrasonic transducer 100*b* according to the seventh modification of Example Embodiment 1 of the present invention, a slit 110*sb* extends from a position inward by about 2 mm in the second direction (Y-axis direction), to a position further inward by about 0.5 mm, from a position at the edge in the second direction (Y-axis direction) on the inner circumferential surface of the frame body 120, for example. That is, the two slits 110*s* were each set to have a length dimension of about 20 mm and a width dimension of about 0.5 mm, for example. Other simulation analysis conditions were the same as those of the ultrasonic transducer 100 shown in FIG. 5.

As shown in FIG. 17, in the ultrasonic transducer 100*b* according to the seventh modification of Example Embodiment 1 of the present invention, a portion of the first diaphragm 110 positioned above the internal space IS inside the frame body 120 and positioned between the slits 110*sb* in the second direction (Y-axis direction) is a vibrating region that is structured to resonate and vibrate. In the first diaphragm 110, the intermediate portion 110*c* positioned at the middle in the longitudinal direction inside the frame body 120 is largely displaced, and the end portions 110*e* positioned outside the slits 110*sb* in the second direction (Y-axis direction) are almost unlikely to be displaced.

Thus, in the ultrasonic transducer 100*b* according to the seventh modification of Example Embodiment 1 of the present invention, an area of the vibrating region of the first diaphragm 110 is reduced, and a change in air pressure due to the vibration of the first diaphragm 110 is reduced, so that a sound pressure is reduced, as compared with the ultrasonic transducer 100 according to Example Embodiment 1 of the present invention. Thus, as in the ultrasonic transducer 100 according to Example Embodiment 1 of the present invention, the slit 110*s* is preferably located near a position at the edge in the second direction (Y-axis direction) on the inner circumferential surface of the frame body 120.

The length dimension of the slit 110*s* in the first direction (X-axis direction) is preferably equal to or greater than the short dimension L2 in the first direction (X-axis direction) inside the frame body 120 from a viewpoint of preventing fixed ends from appearing at both ends in the second direction (Y-axis direction) in the vibrating region in the first diaphragm 110 that is structured to resonate and vibrate.

The width dimension of the slit 110*s* in the second direction (Y-axis direction) is preferably as small as possible from a viewpoint of increasing the area of the vibrating region of the first diaphragm 110. When the first diaphragm 110 and the frame body 120 are bonded to each other with an adhesive, the width dimension of the slit 110*s* in the second direction (Y-axis direction) is preferably equal to or greater than about 0.4 mm and equal to or less than 0.6 mm, for example, in order to prevent the slit 110*s* from being closed by the adhesive entering the slit 110*s* formed near the position at the edge in the second direction (Y-axis direction) on the inner circumferential surface of the frame body 120. Alternatively, the slit 110*s* preferably has the width dimension of equal to or greater than about 0.2 mm and equal to or less than about 0.4 mm from a position inward by about 0.2 mm in the second direction (Y-axis direction), for example, to further inside in the second direction (Y-axis direction), from a position at the edge in the second direction (Y-axis direction) on the inner circumferential surface of the frame body 120. Note that when the slit 110*s* is located at a position at the edge in the second direction (Y-axis direction) on the inner circumferential surface of the frame body 120, an amount of stacking deviation between the first diaphragm 110 and the frame body 120 and an amount of the adhesive oozing out to the inside of the frame body 120 can be visually recognized through the slit 110*s*, and thus the slit 110*s* can be used to improve assembly accuracy of the ultrasonic transducer 100.

The ultrasonic transducer 100 according to Example Embodiment 1 of the present invention includes the first diaphragm 110, the one or more frame bodies 120 and the one or more ultrasonic vibrators 130. The one or more frame bodies 120 extend in the longitudinal direction and are bonded to the first diaphragm 110. The one or more ultrasonic vibrators 130 are attached to the respective one or more frame bodies 120 and face the first diaphragm 110 with a space in between. The first diaphragm 110 is structured to resonate and vibrate in a direction orthogonal to the first diaphragm 110 in a phase opposite to that of the one or more ultrasonic vibrators 130. The dimension L1 in the longitudinal direction inside the one or more frame bodies 120 is greater than the dimension L2 in the lateral direction orthogonal to the longitudinal direction inside the one or more frame bodies 120. The ultrasonic transducer 100 is provided with one or more cavities that cause the external space ES on an opposite side from the one or more frame bodies 120 with respect to the first diaphragm 110 and the internal space IS inside the one or more frame bodies 120 to communicate with each other.

Accordingly, the internal space IS and the external space ES communicate with each other through the cavity, thus, for example, when the adhesive for bonding the first diaphragm 110 and the frame body 120 is heated and cured, a change in pressure in the internal space IS can be reduced, and an increase in internal stress in the ultrasonic transducer 100 can be reduce or prevented. In addition, since a portion adjacent to the cavity becomes a free end of the first diaphragm 110 resonating and vibrating, and is easily displaced, it is possible to reduce the internal stress which is generated in the first diaphragm 110 that is structured to resonate and vibrate. Thus, it is possible to increase a sound pressure level while reducing the internal stress with a simple and compact configuration in the ultrasonic transducer 100.

In the ultrasonic transducer 100 according to Example Embodiment 1 of the present invention, the one or more cavities are provided in the first diaphragm 110. This makes it possible to appropriately set a position where the cavity is provided.

In the ultrasonic transducer 100 according to Example Embodiment 1 of the present invention, the one or more cavities are the slits 110*s* extending in the lateral direction. This reduces or prevents a decrease in the area of the vibrating region of the resonant vibration due to the provision of the slit 110*s*, and thus a high sound pressure can be obtained.

In the ultrasonic transducer 100 according to Example Embodiment 1 of the present invention, the one or more cavities are equal to or larger than the short dimension L2 in the first direction (X-axis direction) inside the one or more frame bodies 120. Accordingly, the first diaphragm 110 can be easily displaced by setting the portion adjacent to the cavity as the free end of the first diaphragm 110 that is structured to resonate and vibrate. Thus, the sound pressure level can be increased.

In the ultrasonic transducer 100 according to Example Embodiment 1 of the present invention, the two cavities are open at both the respective end portions in the second direction (Y-axis direction) inside the one or more frame bodies 120. Thus, the resonant frequencies of the first diaphragm 110 and the ultrasonic vibrator 130 can be maintained substantially constant regardless of the longitudinal dimension L1 inside the frame body 120.

In a parametric speaker including the ultrasonic transducer 100 according to Example Embodiment 1 of the present invention, an ultrasonic wave emitted from the ultrasonic transducer 100 can be modulated by modulation driving of the ultrasonic transducer 100 to reproduce an audible sound. As a modulation method, there are an AM modulation method (amplitude modulation method) and an FM modulation method (frequency modulation method).

In the ultrasonic transducer 100 according to Example Embodiment 1 of the present invention, the resonant frequencies of the first diaphragm 110 and the ultrasonic vibrator 130 are equal to or higher than 100 KHz. Accordingly, as will be described later, when the resonant frequencies are equal to or higher than about 100 kHz, for example, attenuation of sound waves with respect to propagation distance is large, thus, the parametric speaker including the ultrasonic transducer 100 can reproduce an audible sound only in a limited space.

In the ultrasonic transducer 100 according to Example Embodiment 1 of the present invention, a relationship of $0.25CpTp/Cv \leq Tv \leq 0.6CpTp/Cv$ is satisfied, where Cv is the acoustic velocity of the transverse wave of the first diaphragm 110, Cp is the acoustic velocity of the transverse wave of the piezoelectric body 131, Tv is the thickness dimension of the first diaphragm 110, and Tp is the thickness dimension of the piezoelectric body 131. This makes it possible to drive the ultrasonic transducer 100 in a state in which the internal stress (value normalized per sound pressure) in the third direction (Z-axis direction) generated in the ultrasonic transducer 100 is decreased. Accordingly, it is possible to generate high-sound-pressure ultrasonic waves while reducing or preventing occurrence of cracks due to the internal stress in each of the bonding portion between the first diaphragm 110 and the frame body 120 and the bonding portion between the frame body 120 and the ultrasonic vibrator 130.

In the ultrasonic transducer 100 according to Example Embodiment 1 of the present invention, a relationship of $0.7CpTp/Cv \leq Tv \leq 1.3CpTp/Cv$ is satisfied, where Cv is the acoustic velocity of the transverse wave of the first diaphragm 110, Cp is the acoustic velocity of the transverse wave of the piezoelectric body 131, Tv is the thickness dimension of the first diaphragm 110, and Tp is the thickness dimension of the piezoelectric body 131. Accordingly, it is possible to reduce or prevent vibration leakage while maintaining the physical balance between the first diaphragm 110 and the ultrasonic vibrator 130 during vibration, and increasing amplitude of the resonant vibration of the first diaphragm 110 to increase a sound pressure.

In the first modification of the ultrasonic transducer 100 according to Example Embodiment 1 of the present invention, the ultrasonic vibrator is a unimorph-type piezoelectric vibrator, and the second diaphragm is provided on the side of the piezoelectric body 131 opposite to the frame body side. This makes it possible to maintain the displacement of the first diaphragm 110 high while reducing power consumption, and to improve the efficiency of the ultrasonic transducer.

Example Embodiment 2

Hereinafter, an ultrasonic transducer according to Example Embodiment 2 of the present invention will be described with reference to the drawings. The ultrasonic transducer according to Example Embodiment 2 of the present invention is different from the ultrasonic transducer according to Example Embodiment 1 of the present invention in that a plurality of ultrasonic vibrators are arranged in an array, and thus description of a configuration similar to that of the ultrasonic transducer according to Example Embodiment 1 of the present invention will not be repeated.

Figure 18:
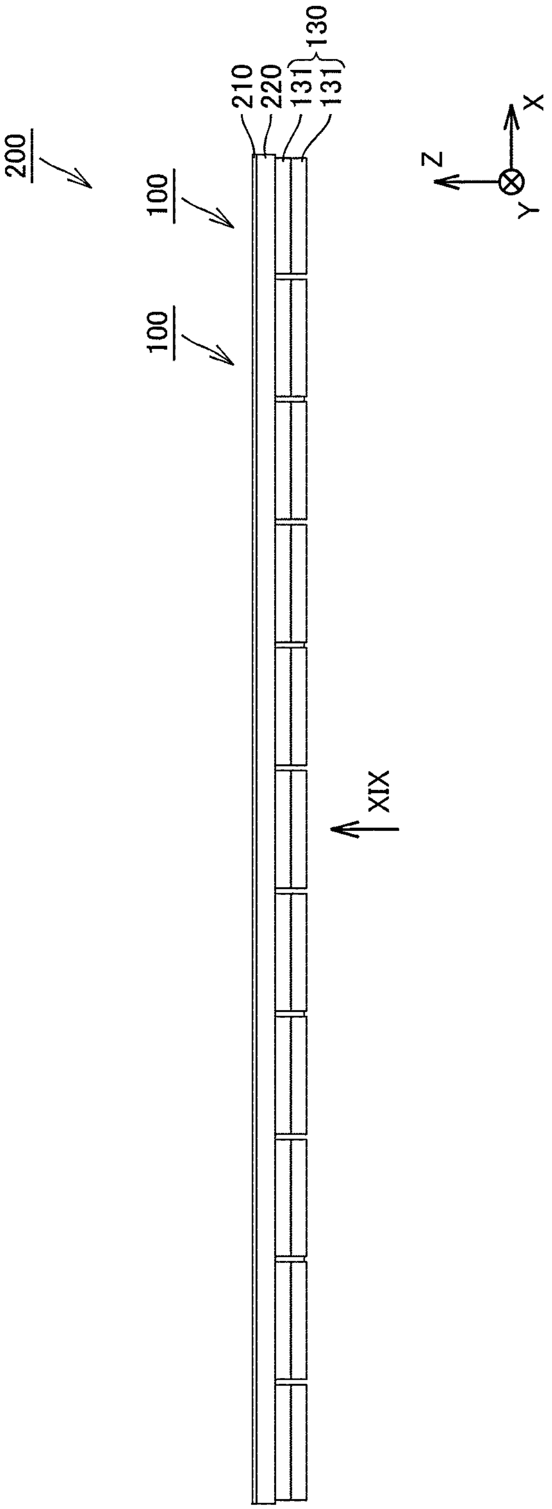
FIG. 18 is a side view illustrating a configuration of an ultrasonic transducer according to Example Embodiment 2 of the present invention.
Figure 19:
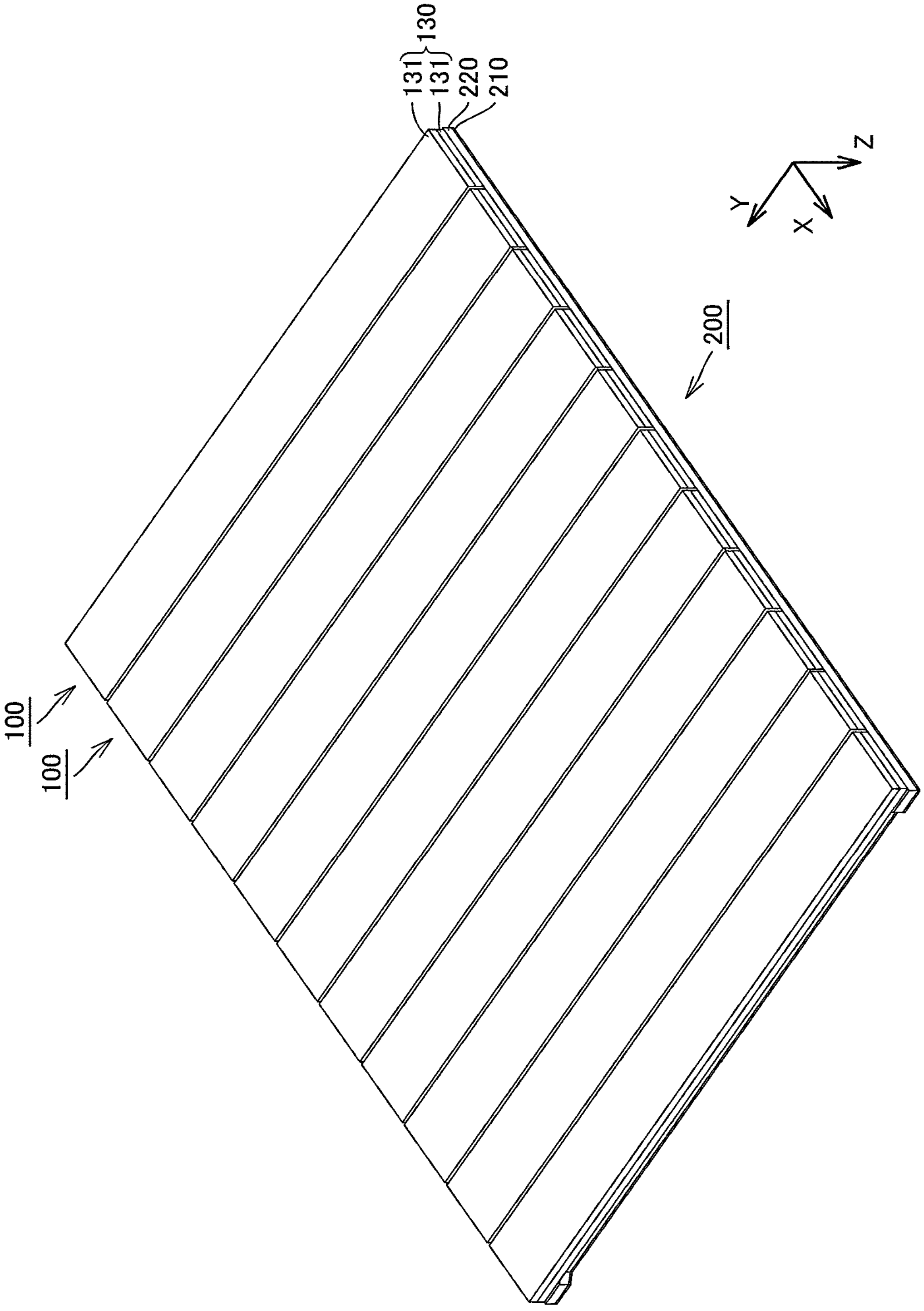
FIG. 19 is a rear view of the ultrasonic transducer illustrated in FIG. 18 as viewed in a direction of an arrow XIX.

FIG. 18 is a side view illustrating a configuration of the ultrasonic transducer according to Example Embodiment 2 of the present invention. FIG. 19 is a rear view of the ultrasonic transducer illustrated in FIG. 18 as viewed in a direction of the arrow XIX.

As illustrated in FIG. 18 and FIG. 19, in an ultrasonic transducer 200 according to Example Embodiment 2 of the present invention, the ultrasonic transducers 100 arranged side by side in an array in the first direction (X-axis direction) according to Example Embodiment 1 are integrally configured. The ultrasonic transducer 200 includes a first diaphragm 210, a plurality of frame bodies 220, and a plurality of the ultrasonic vibrators 130. The plurality of frame bodies 220 are bonded to the first diaphragm 210, and the plurality of ultrasonic vibrators 130 are bonded to the respective plurality of frame bodies 220.

Figure 20:
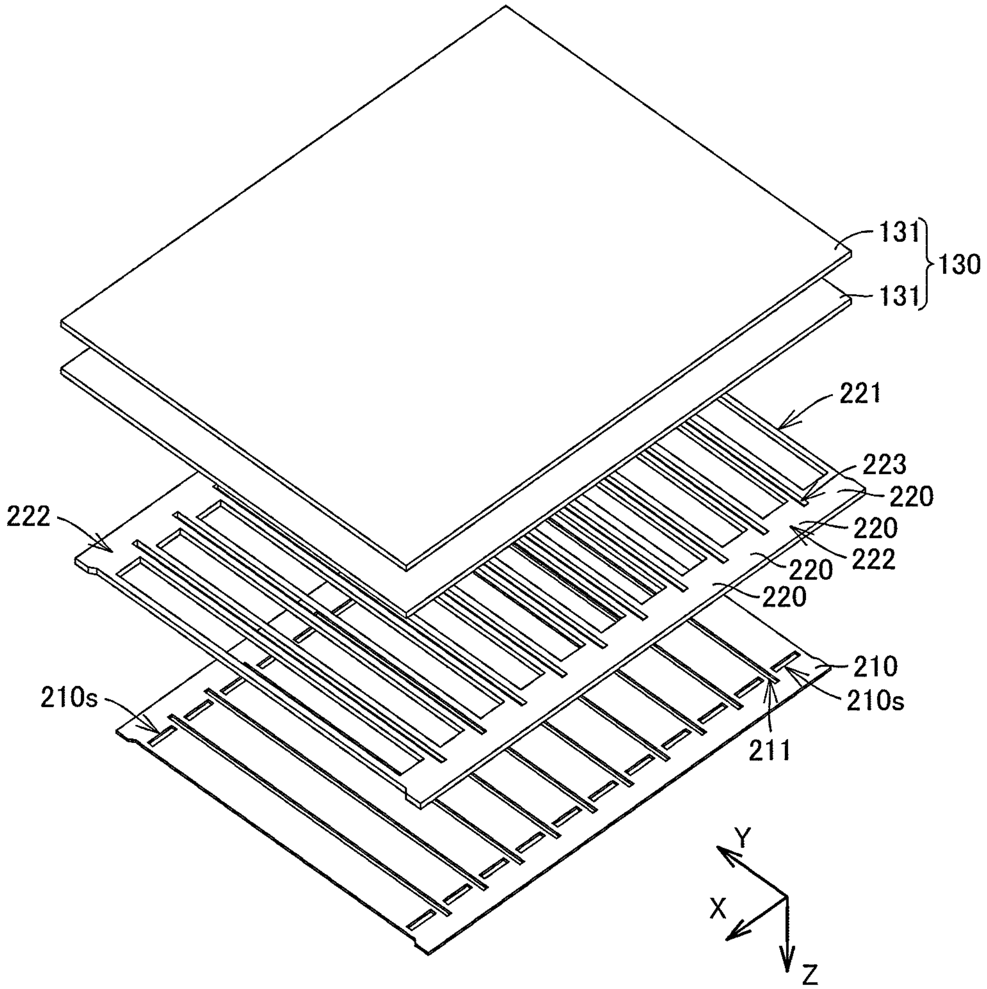
FIG. 20 is an exploded perspective view illustrating a stacked state in a step of stacking and bonding components each included in the ultrasonic transducer according to Example Embodiment 2 of the present invention.

Here, a method of 41 manufacturing the ultrasonic transducer 200 will be described. FIG. 20 is an exploded perspective view illustrating a stacked state in a step of stacking and bonding components each included in the ultrasonic transducer according to Example Embodiment 2 of the present invention.

As illustrated in FIG. 20, the first diaphragm 210 has a flat plate shape, and a plurality of slits 211 extending in the second direction (Y-axis direction) are located at intervals in the first direction (X-axis direction). In the first diaphragm 210, a plurality of slits 210*s* include a plurality of cavities that cause an external space on an opposite side from the plurality of frame bodies 220 with respect to the first diaphragm 210 and an internal space inside the plurality of frame bodies 220 to communicate with each other. The positional relationship between the frame bodies 220 and the slits 210*s* is similar to the positional relationship between the frame body 120 and the slit 110*s* in Example Embodiment 1.

The first diaphragm 210 is made of an aluminum alloy such as duralumin containing aluminum, or metal such as stainless steel. In the present example embodiment, the first diaphragm 210 is made of stainless steel. The plurality of slits 211 and the plurality of slits 210*s* are formed by etching, cutting, or the like.

Each of the plurality of frame bodies 220 has a rectangular annular shape. Each of the plurality of frame bodies 220 has a lateral direction along the first direction (X-axis direction) and has a longitudinal direction along the second direction (Y-axis direction). Each of the plurality of frame bodies 220 extends in the second direction (the Y-axis direction). An axial direction of each of the plurality of frame bodies 220 is along the third direction (Z-axis direction). Each of the plurality of frame bodies 220 has a pair of long side portions 221 extending in the second direction (Y-axis direction) and a pair of short side portions 222 extending in the first direction (X-axis direction). A shortest interval between the long side portions 221 is larger than a shortest interval between the short side portions 222.

The plurality of frame bodies 220 are arranged such that the frame bodies 220 are aligned in the first direction (X-axis direction). A slit 223 is located between the frame bodies 220 adjacent to each other in the first direction (X-axis direction). A plurality of the slits 223 are formed by etching, cutting, or the like. The long side portions 221 adjacent to each other in the frame bodies 220 adjacent to each other in the first direction (X-axis direction) are separated from each other by the slit 223.

The frame bodies 220 adjacent to each other in the first direction (X-axis direction) are connected to each other at the short side portions 222. That is, the frame bodies 220, of the plurality of frame bodies 220, adjacent to each other in the lateral direction are connected to each other at both end portions in the longitudinal direction.

Each of the frame bodies 220 is made of an aluminum alloy or metal such as stainless steel, glass epoxy, resin, or the like. In the present example embodiment, the plurality of frame bodies 220 include one thin plate, but the present invention is not limited thereto, and the short side portions 222 of the plurality of frame bodies 220 may be mutually bonded and integrally formed, where the plurality of frame bodies 220 include respective thin plates.

In the present example embodiment, each of the plurality of ultrasonic vibrators 130 includes the two stacked piezoelectric bodies 131. As illustrated in FIG. 20, the two piezoelectric bodies 131 included in the plurality of ultrasonic vibrators 130 are stacked and bonded in a state of two thin plates.

Figure 21:
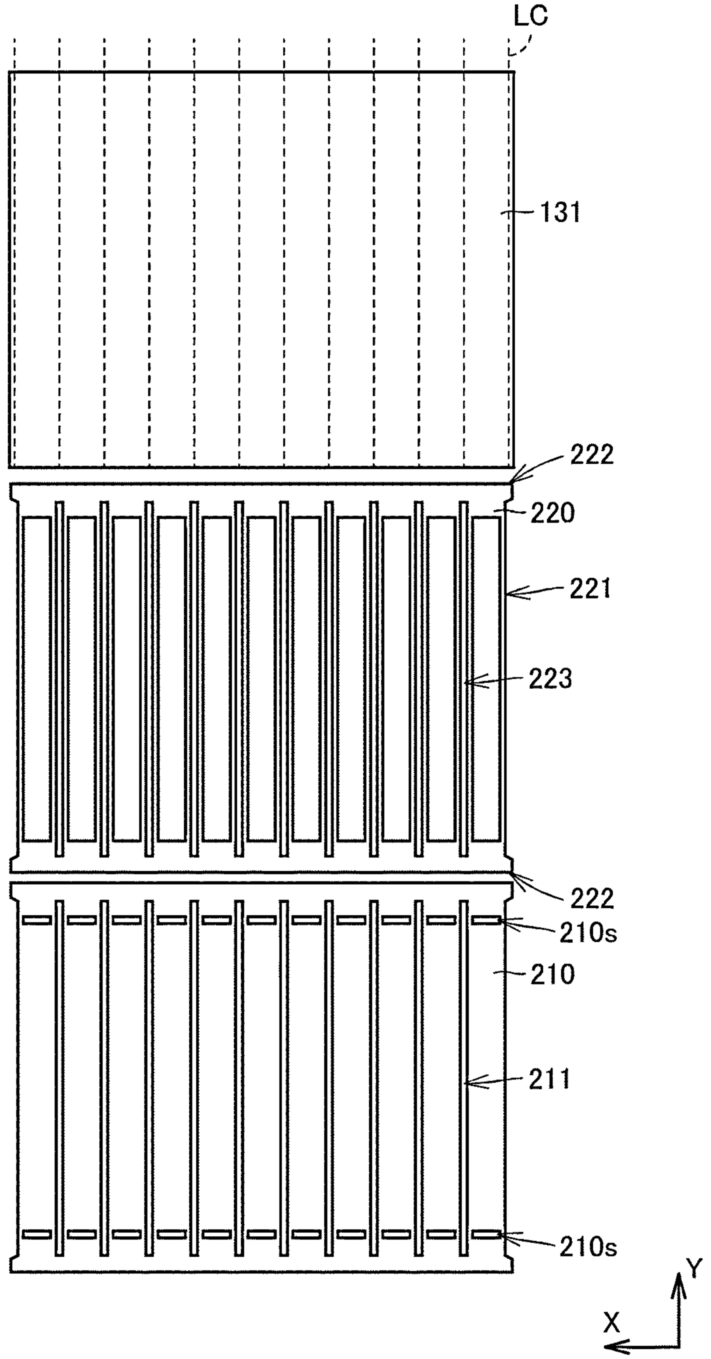
FIG. 21 is a plan view illustrating a positional relationship in a first direction (X-axis direction) in a step of cutting a piezoelectric body of the ultrasonic transducer according to Example Embodiment 2 of the present invention.

FIG. 21 is a plan view illustrating a positional relationship in the first direction (X-axis direction) in a step of cutting a piezoelectric body of the ultrasonic transducer according to Example Embodiment 2 of the present invention. In FIG. 21, the only one piezoelectric body 131 is illustrated.

As illustrated in FIG. 21, the slit 211 and the slit 223 are arranged at the same position in the first direction (X-axis direction) so as to overlap each other in the third direction (Z-axis direction). The piezoelectric body 131 is cut and divided by a dicer or the like along a plurality of cut lines LC extending in the second direction (Y-axis direction) so as to overlap the slits 211 and the slits 223 in the third direction (Z-axis direction). As a result, the ultrasonic transducer 200 illustrated in FIG. 18 and FIG. 19 is provided.

Figure 22:
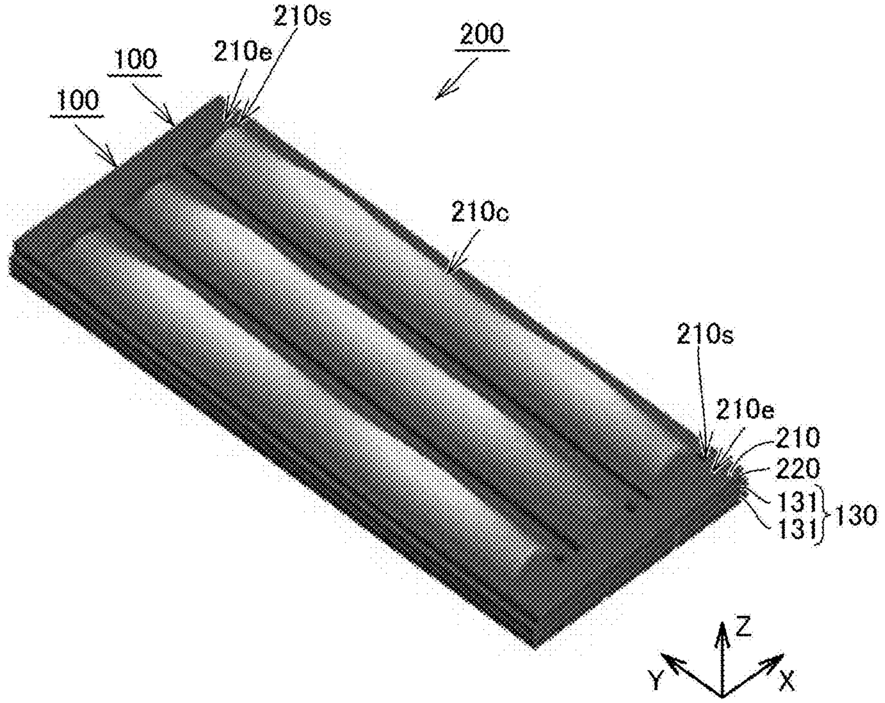
FIG. 22 is a perspective view showing a displacement state obtained by a simulation analysis using a finite element method when the ultrasonic transducer according to Example Embodiment 2 of the present invention is transmitting or receiving ultrasonic waves.

FIG. 22 is a perspective view showing a displacement state obtained by a simulation analysis using a finite element method when the ultrasonic transducer according to Example Embodiment 2 of the present invention is transmitting or receiving ultrasonic waves.

As shown in FIG. 22, a portion of the first diaphragm 210 positioned above an internal space inside each frame body 220 and positioned between the slits 210*s* in the second direction (Y-axis direction) is a vibrating region that is structured to resonate and vibrate. A longitudinal dimension of the vibrating region of the first diaphragm 210 is a dimension between the slits 210*s* in the second direction (Y-axis direction), and a short dimension of the vibrating region of the first diaphragm 210 is equal to a short dimension inside each frame body 220. In the first diaphragm 210, an intermediate portion 210*c* positioned at a middle in the longitudinal direction inside each frame body 220 is largely displaced, and end portions 210*e* positioned at respective ends in the longitudinal direction inside each frame body 220 are almost unlikely to be displaced.

Since the ultrasonic transducer 100 according to Example Embodiment 1 has node points at respective end portions in the second direction (Y-axis direction) as the longitudinal direction, even when the ultrasonic transducer 200 according to Example Embodiment 2 is configured by connecting the ultrasonic transducers 100 according to Example Embodiment 1 to each other at both the end portions to be arrayed, a resonant vibration of each ultrasonic transducer 100 is not inhibited. Thus, a sound pressure level can be easily increased by increasing the number of ultrasonic transducers 100 included in the ultrasonic transducer 200 according to Example Embodiment 2.

In parametric speaker including the ultrasonic transducer 200 according to Example Embodiment 2 of the present invention, an ultrasonic wave emitted from the ultrasonic transducer) can be modulated by modulation driving of the ultrasonic transducer 200 to reproduce an audible sound.

Here, a result of a simulation analysis, using a finite element method, about a relationship between ultrasonic frequency and sound pressure level attenuation due to propagation distance will be described. As simulation analysis conditions, for example, transitions of attenuation due to propagation distance of an audible sound at a frequency of about 4 KHz reproduced from an ultrasonic wave of a resonant frequency of about 146 kHz transmitted from the ultrasonic transducer 200 according to the present example embodiment, and an audible sound at a frequency of about 4 kHz reproduced from an ultrasonic wave at a resonant frequency of about 40 KHz transmitted from an ultrasonic element array according to a second comparative example were analyzed by simulation using a finite element method.

Figure 23:
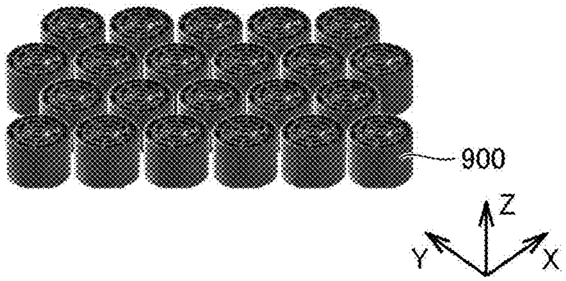
FIG. 23 is a perspective view illustrating a configuration of an ultrasonic element array according to a second comparative example.

FIG. 23 is a perspective view illustrating a configuration of the ultrasonic element array according to the second comparative example. As illustrated in FIG. 23, in the ultrasonic element array according to the second comparative example, 50 ultrasonic elements 900 are arranged in a matrix at intervals in between.

Figure 24:
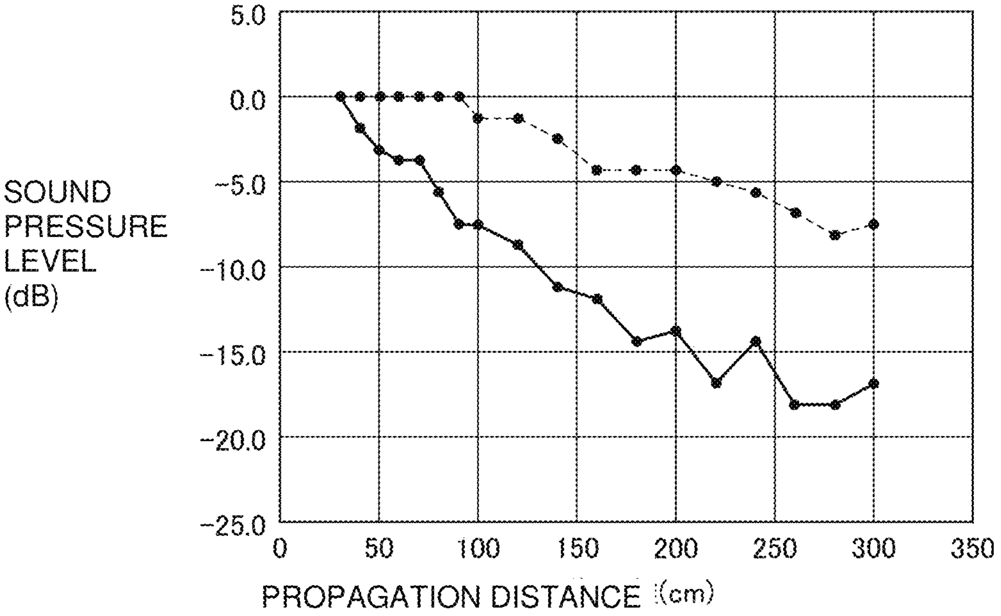
FIG. 24 is a graph obtained by actual measurement of attenuation transition of the sound pressure level due to propagation distance in the ultrasonic transducer according to the present example embodiment and an ultrasonic transducer according to the second comparative example.

FIG. 24 is a graph obtained by actual measurement of the transitions of the sound pressure level attenuation due to the propagation distance in the ultrasonic transducer according to the present example embodiment and an ultrasonic transducer according to the second comparative example. In FIG. 24, a vertical axis represents the sound pressure level (dB), and a horizontal axis represents the propagation distance (cm). Data of the ultrasonic transducer 200 according to the present example embodiment is indicated by a solid line, and data of the ultrasonic transducer according to the second comparative example is indicated by a dotted line. The sound pressure level is a value obtained by normalizing a sound pressure level of an audible sound at a frequency of about 4 kHz at a point separated by about 30 cm in the third direction (Z-axis direction) from a front of each of the ultrasonic transducer and the ultrasonic element array, as 0 dB, for example.

As shown in FIG. 24, an audible sound reproduced from an ultrasonic wave at a resonant frequency of about 146 kHz transmitted from the ultrasonic transducer 200 according to the present example embodiment was greatly attenuated due to propagation distance, for example, as compared with an audible sound reproduced from an ultrasonic wave at a resonant frequency of about 40 kHz transmitted from the ultrasonic element array according to the second comparative example. This is because a high-frequency ultrasonic wave is easily absorbed by air as heat, and thus an audible sound reproduced using the high-frequency ultrasonic wave as a carrier wave is more greatly attenuated due to propagation distance.

As described above, in the parametric speaker including the ultrasonic transducer 200 according to the present example embodiment that transmits high-frequency ultrasonic waves at a frequency equal to or higher than about 100 kHz, for example, it is possible to prevent sound from reaching an unnecessarily long distance and from leaking due to unnecessary reflection, and to reproduce an audible sound only in a limited space. In addition, in the ultrasonic transducer 200, since attenuation of an audible sound due to propagation distance can be increased without providing a configuration for transmitting a carrier wave of an opposite phase as in Japanese Patent No. 6333480, a simple and compact configuration can be achieved. Further, since an ultrasonic wave having a high frequency equal to or higher than about 100 kHz, for example, is outside an audible range of animals such as dogs and cats, influence on these animals can be reduce or prevented.

As shown in FIG. 24, in order to attenuate an audible sound at a propagation distance of about 30 cm or longer, a length needs to be equal to or less than about 30 cm, for example. A Rayleigh length R0 satisfies a relationship $R0=(k\times a^2)/2$. K is a wave number and a is a radius of a sound source. Thus, when acoustic velocity in air is about 340 m/s, the longitudinal dimension of the vibrating region of the first diaphragm 210 is equal to or less than about 36 mm when an ultrasonic wave has a frequency at about 100 kHz, for example, the longitudinal dimension of the vibrating region of the first diaphragm 210 is equal to or less than about 29.4 mm when an ultrasonic wave has a frequency at about 150 kHz, and the longitudinal dimension of the vibrating region of the first diaphragm 210 is equal to or less than about 25.5 mm when an ultrasonic wave has a frequency at about 200 kHz, for example.

The ultrasonic transducer 200 according to the present example embodiment can be used as a phased array system.

In the ultrasonic transducer 200 according to Example Embodiment 2 of the present invention, the one or more frame bodies 220 are arranged so as to be aligned in the lateral direction and are bonded to the first diaphragm 210, and the frame bodies 220, of the one or more frame bodies 220, adjacent to each other in the lateral direction are connected to each other at both end portions in the longitudinal direction. Thus, a sound pressure level can be easily increased.

Example Embodiment 3

Hereinafter, an ultrasonic transducer according to Example Embodiment 3 of the present invention will be described with reference to the drawings. The ultrasonic transducer according to Example Embodiment 3 of the present invention is different from the ultrasonic transducer according to Example Embodiment 1 of the present invention in a position of a cavity and the number of cavities, and thus description of a configuration similar to that of the ultrasonic transducer according to Example Embodiment 1 of the present invention will not be repeated.

Figure 25:
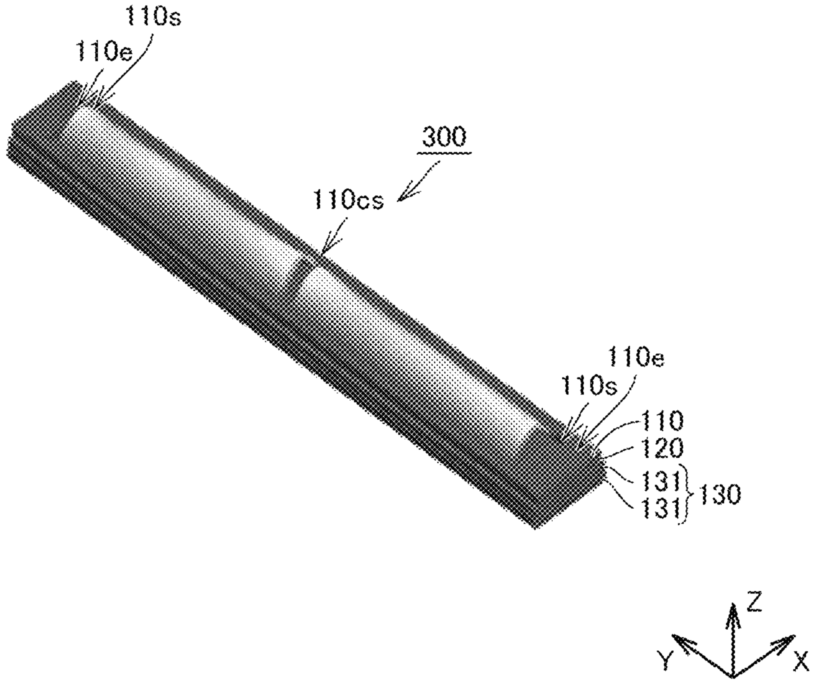
FIG. 25 is a perspective view showing a displacement state obtained by a simulation analysis using a finite element method when an ultrasonic transducer according to Example Embodiment 3 of the present invention is transmitting or receiving ultrasonic waves.

FIG. 25 is a perspective view showing a displacement state obtained by a simulation analysis using a finite element method when the ultrasonic transducer according to Example Embodiment 3 of the present invention is transmitting or receiving ultrasonic waves. As shown in FIG. 25, in an ultrasonic transducer 300 according to Example Embodiment 3 of the present invention, an intermediate slit **110*cs* is formed in the first diaphragm 110 as a cavity that is open in a center portion in the longitudinal direction inside the frame body 120. A length dimension of the intermediate slit 110*cs* in the first direction (X-axis direction) is the same as the short dimension L2 in the first direction (X-axis direction) inside the frame body 120. A width dimension in the second direction (the Y-axis direction) of the intermediate slit 110*cs* is equal to or greater than about 0.2 mm and equal to or less than about 0.6 mm, for example. Other simulation analysis conditions were the same as those of the simulation analysis shown in FIG. 5**.

Figure 26:
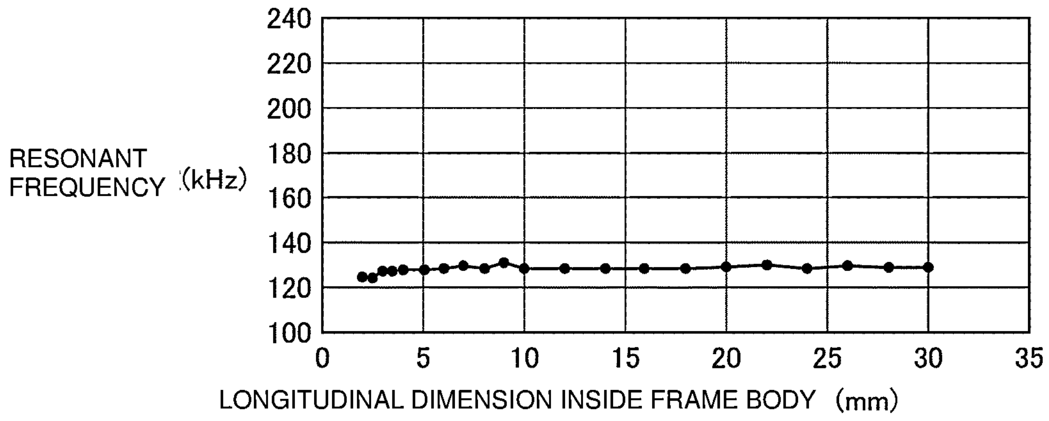
FIG. 26 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 3 of the present invention.

FIG. 26 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 3 of the present invention. In FIG. 26, a vertical axis represents the resonant frequency (kHz) of the first diaphragm 110, and a horizontal axis represents the longitudinal dimension L1 (mm) inside the frame body 120. As a simulation analysis condition, the short dimension L2 inside the frame body 120 was fixed to about 2 mm, for example.

As shown in FIG. 26, the resonant frequencies of the first diaphragm 110 and the ultrasonic vibrator 130 were substantially constant at about 130 kHz, for example, regardless of the change in the longitudinal dimension L1 inside the frame body 120. That is, the resonant frequency of the first diaphragm 110 is determined by acoustic velocity in the first diaphragm 110 and reflection of vibration with the frame body 120 as fixed ends, but influence of the short dimension L2 becomes dominant with respect to the reflection of vibration regardless of the longitudinal dimension L1 inside the frame body 120, and the state of reflection of vibration does not change even when the longitudinal dimension L1 becomes larger.

Figure 27:
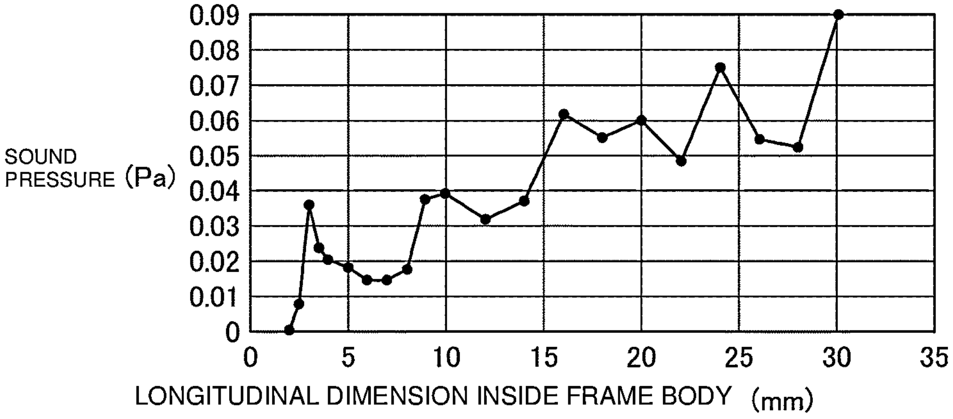
FIG. 27 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 3 of the present invention.

FIG. 27 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 3 of the present invention. In FIG. 27, a vertical axis represents the sound pressure (Pa) transmitted from the ultrasonic transducer 100, and a horizontal axis represents the longitudinal dimension L1 (mm) inside the frame body 120. As a simulation analysis condition, the short dimension L2 inside the frame body 120 was fixed to about 2 mm, and the sound pressure (Pa) at a position separated by about 30 cm in the third direction (Z-axis direction) from the first diaphragm 110 in front of the ultrasonic transducer 300 was calculated, for example.

As shown in FIG. 27, the sound pressure of the ultrasonic wave transmitted from the ultrasonic transducer 300 was increased as the longitudinal dimension L1 inside the frame body 120 was increased. This means that even when the longitudinal dimension of the vibrating region of the first diaphragm 110 is increased, an entirety of the vibrating region of the first diaphragm 110 between the slits **110*s* vibrates. That is, an area of the vibrating region can be increased by an increment corresponding to an increased length of the vibrating region of the first diaphragm 110, and as a result, a change in pressure of the air due to the vibration of the first diaphragm 110** can be increased to obtain a high sound pressure.

As described above, even in the ultrasonic transducer 300 according to the present example embodiment, the sound pressure can be increased while maintaining the resonant frequency substantially constant by increasing the longitudinal dimension of the vibrating region of the first diaphragm 110.

Figure 28:
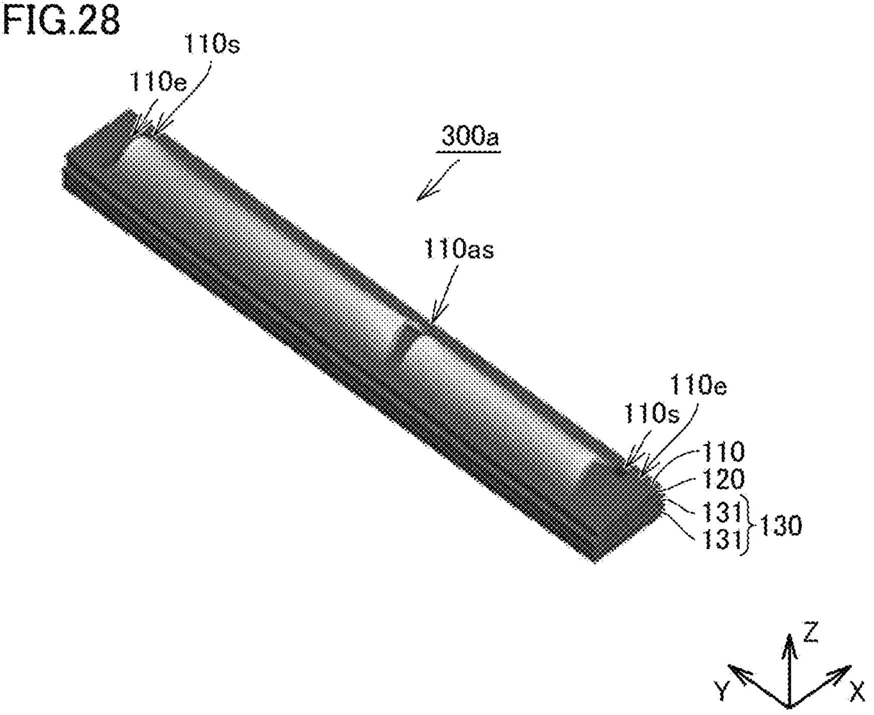
FIG. 28 is a perspective view showing a displacement state obtained by a simulation analysis using a finite element method when an ultrasonic transducer according to a modification of Example Embodiment 3 of the present invention is transmitting or receiving ultrasonic waves.

Note that the intermediate slit may be open at a position shifted from the center portion in the longitudinal direction inside the frame body 120. FIG. 28 is a perspective view showing a displacement state obtained by a simulation analysis using a finite element method when the ultrasonic transducer according to a modification of Example Embodiment 3 of the present invention is transmitting or receiving ultrasonic waves. As shown in FIG. 28, in an ultrasonic transducer 300*a* according to a modification of Example Embodiment 3 of the present invention, an intermediate slit 110*as* is formed in the first diaphragm 110 as a cavity that is open at a position shifted from a center portion toward an end portion in the longitudinal direction inside the frame body 120.

Example Embodiment 4

Hereinafter, an ultrasonic transducer according to Example Embodiment 4 of the present invention will be described with reference to the drawings. The ultrasonic transducer according to Example Embodiment 4 of the present invention is different from the ultrasonic transducer according to Example Embodiment 1 of the present invention in a position of a cavity and the number of cavities, and thus description of a configuration similar to that of the ultrasonic transducer according to Example Embodiment 1 of the present invention will not be repeated.

Figure 29:
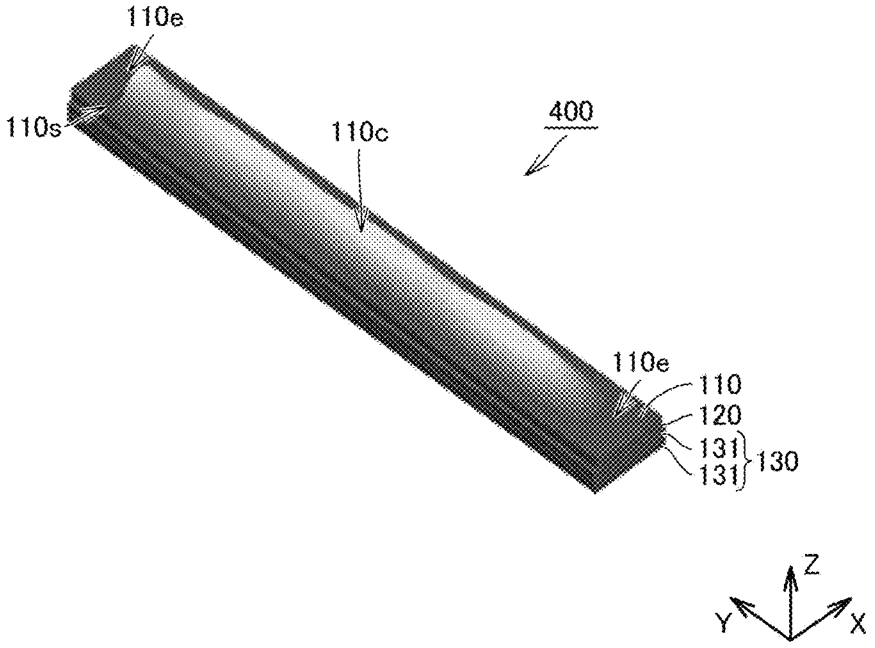
FIG. 29 is a perspective view showing a displacement state obtained by a simulation analysis using a finite element method when an ultrasonic transducer according to Example Embodiment 4 of the present invention is transmitting or receiving ultrasonic waves.

FIG. 29 is a perspective view showing a displacement state obtained by a simulation analysis using a finite element method when the ultrasonic transducer according to Example Embodiment 4 of the present invention is transmitting or receiving ultrasonic waves. As shown in FIG. 29, in an ultrasonic transducer 400 according to Example Embodiment 4 of the present invention, one cavity is open at one of both end portions in the longitudinal direction inside the frame body 120. That is, only the one slit 110*s* is provided. Other simulation analysis conditions were the same as those of the simulation analysis shown in FIG. 5.

Figure 30:
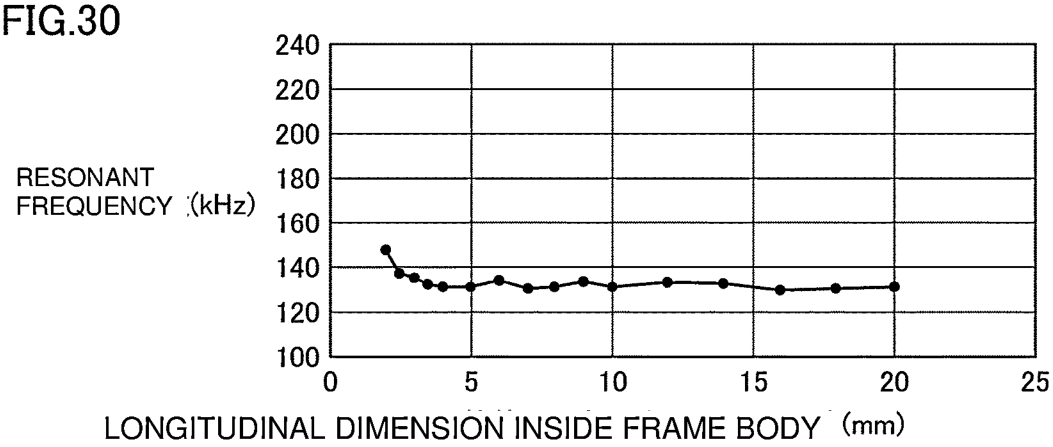
FIG. 30 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 4 of the present invention.

FIG. 30 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 4 of the present invention. In FIG. 30, a vertical axis represents the resonant frequency (kHz) of the first diaphragm 110, and a horizontal axis represents the longitudinal dimension L1 (mm) inside the frame body 120. As a simulation analysis condition, the short dimension 12 inside the frame body 120 was fixed to about 2 mm, for example.

As shown in FIG. 30, in a range where the longitudinal dimension L1 inside the frame body 120 is equal to or greater than twice the short dimension L2, the resonant frequencies of the first diaphragm 110 and the ultrasonic vibrator 130 were constant or substantially constant at about 130 kHz, for example. That is, the resonant frequency of the first diaphragm 110 is determined by acoustic velocity in the first diaphragm 110 and reflection of vibration with the frame body 120 as fixed ends, but influence of the short dimension L2 becomes dominant with respect to the reflection of vibration when the longitudinal dimension L1 inside the frame body 120 reaches or exceeds twice the short dimension L2, and the state of reflection of vibration does not change even when the longitudinal dimension L1 becomes further large.

Figure 31:
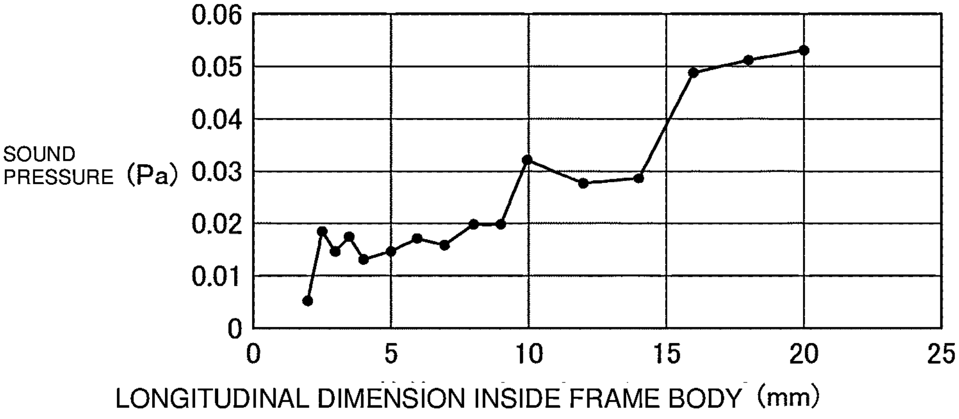
FIG. 31 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 4 of the present invention.

FIG. 31 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 4 of the present invention. In FIG. 31, a vertical axis represents the sound pressure (Pa) transmitted from the ultrasonic transducer 100, and a horizontal axis represents the longitudinal dimension L1 (mm) inside the frame body 120. As a simulation analysis condition, the short dimension L2 inside the frame body 120 was fixed to about 2 mm, and the sound pressure (Pa) at a position separated by about 30 cm in the third direction (Z-axis direction) from the first diaphragm 110 in front of the ultrasonic transducer 400 was calculated, for example.

As shown in FIG. 31, the sound pressure of the ultrasonic wave transmitted from the ultrasonic transducer 400 was increased as the longitudinal dimension L1 inside the frame body 120 was increased. This means that even when the longitudinal dimension of the vibrating region of the first diaphragm 110 is increased, an entirety of the vibrating region of the first diaphragm 110 vibrates. That is, an area of the vibrating region can be increased by an increment corresponding to an increased length of the vibrating region of the first diaphragm 110, and as a result, a change in pressure of the air due to the vibration of the first diaphragm 110 can be increased to obtain a high sound pressure.

As described above, even in the ultrasonic transducer 400 according to the present example embodiment, the sound pressure can be increased while maintaining the resonant frequency constant or substantially constant by increasing the longitudinal dimension of the vibrating region of the first diaphragm 110 to be equal to or greater than twice the short dimension.

Example Embodiment 5

Hereinafter, an ultrasonic transducer according to Example Embodiment 5 of the present invention will be described with reference to the drawings. The ultrasonic transducer according to Example Embodiment 5 of the present invention is different from the ultrasonic transducer according to Example Embodiment 1 of the present invention in a position of a cavity and the number of cavities, and thus description of a configuration similar to that of the ultrasonic transducer according to Example Embodiment 1 of the present invention will not be repeated.

Figure 32:
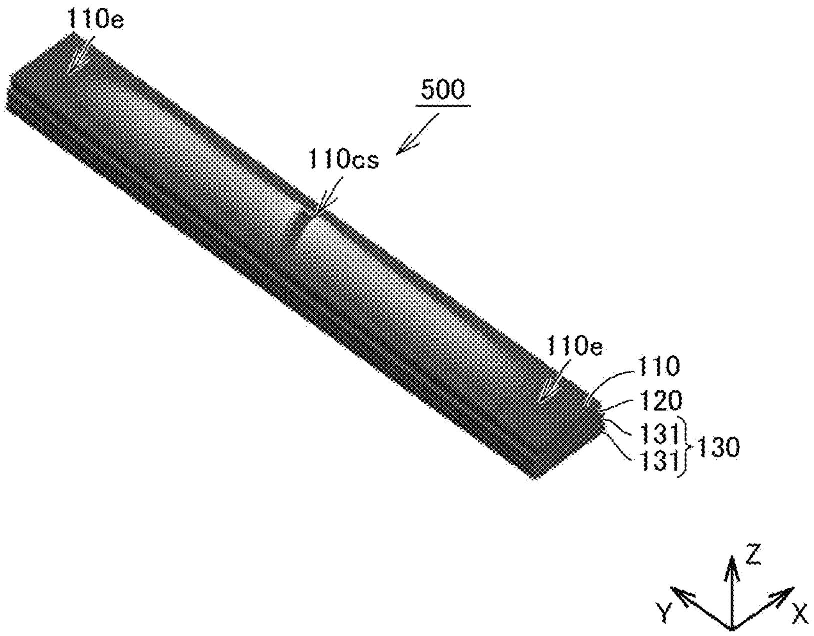
FIG. 32 is a perspective view showing a displacement state obtained by a simulation analysis using a finite element method when an ultrasonic transducer according to Example Embodiment 5 of the present invention is transmitting or receiving ultrasonic waves.

FIG. 32 is a perspective view showing a displacement state obtained by a simulation analysis using a finite element method when the ultrasonic transducer according to Example Embodiment 5 of the present invention is transmitting or receiving ultrasonic waves. As shown in FIG. 32, in an ultrasonic transducer 500 according to Example Embodiment 5 of the present invention, one cavity is open in a center portion in the longitudinal direction inside the frame body 120. That is, only the intermediate slit 110*cs* is provided. Other simulation analysis conditions were the same as those of the simulation analysis shown in FIG. 5.

Figure 33:
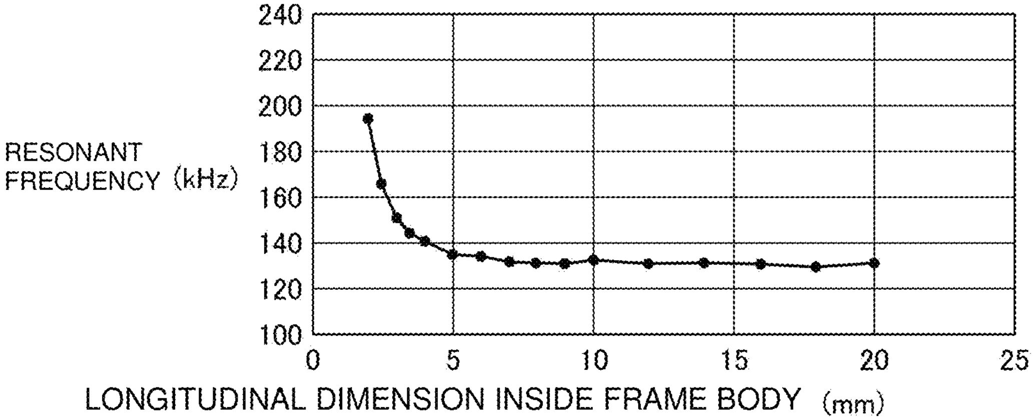
FIG. 33 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 5 of the present invention.

FIG. 33 is a graph obtained by a simulation analysis, using a finite element method, of a transition of a resonant frequency of a first diaphragm when a longitudinal dimension is changed while a short dimension is fixed inside a frame body in the ultrasonic transducer according to Example Embodiment 5 of the present invention. In FIG. 33, a vertical axis represents the resonant frequency (kHz) of the first diaphragm 110, and a horizontal axis represents the longitudinal dimension L1 (mm) inside the frame body 120. As a simulation analysis condition, the short dimension L2 inside the frame body 120 was fixed to about 2 mm, for example.

As shown in FIG. 33, in a range where the longitudinal dimension L1 inside the frame body 120 is equal to or greater than four times the short dimension L2, the resonant frequencies of the first diaphragm 110 and the ultrasonic vibrator 130 are constant or substantially constant at about 130 kHz, for example. That is, the resonant frequency of the first diaphragm 110 is determined by acoustic velocity in the first diaphragm 110 and reflection of vibration with the frame body 120 as fixed ends, but influence of the short dimension L2 becomes dominant with respect to the reflection of vibration when the longitudinal dimension L1 inside the frame body 120 reaches or exceeds four times the short dimension L2, and the state of reflection of vibration does not change even when the longitudinal dimension L1 becomes further large.

Figure 34:
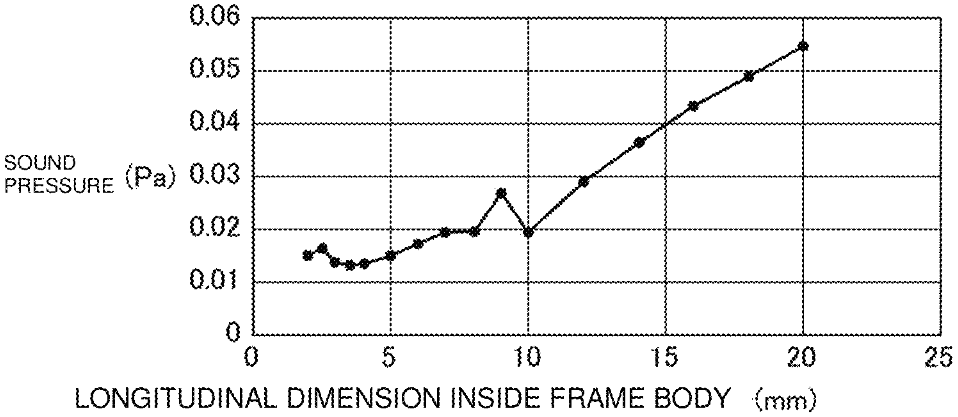
FIG. 34 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 5 of the present invention.

FIG. 34 is a graph obtained by a simulation analysis, using a finite element method, of a sound pressure transition of an ultrasonic wave transmitted from the ultrasonic transducer when the longitudinal dimension is changed while the short dimension is fixed inside the frame body in the ultrasonic transducer according to Example Embodiment 5 of the present invention. In FIG. 34, a vertical axis represents the sound pressure (Pa) transmitted from the ultrasonic transducer 100, and a horizontal axis represents the longitudinal dimension L1 (mm) inside the frame body 120. As a simulation analysis condition, the short dimension L2 inside the frame body 120 was fixed to about 2 mm, and the sound pressure (Pa) at a position separated by about 30 cm in the third direction (Z-axis direction) from the first diaphragm 110 in front of the ultrasonic transducer 500 was calculated, for example.

As shown in FIG. 34, the sound pressure of the ultrasonic wave transmitted from the ultrasonic transducer 400 was increased as the longitudinal dimension L1 inside the frame body 120 was increased. This means that even when the longitudinal dimension of the vibrating region of the first diaphragm 110 is increased, an entirety of the vibrating region of the first diaphragm 110 vibrates. That is, an area of the vibrating region can be increased by an increment corresponding to an increased length of the vibrating region of the first diaphragm 110, and as a result, a change in pressure of the air due to the vibration of the first diaphragm 110 can be increased to obtain a high sound pressure.

As described above, even in the ultrasonic transducer 500 according to the present example embodiment, the sound pressure can be increased while maintaining the resonant frequency substantially constant by increasing the longitudinal dimension of the vibrating region of the first diaphragm 110 to be equal to or greater than about four times the short dimension.

Figure 35:
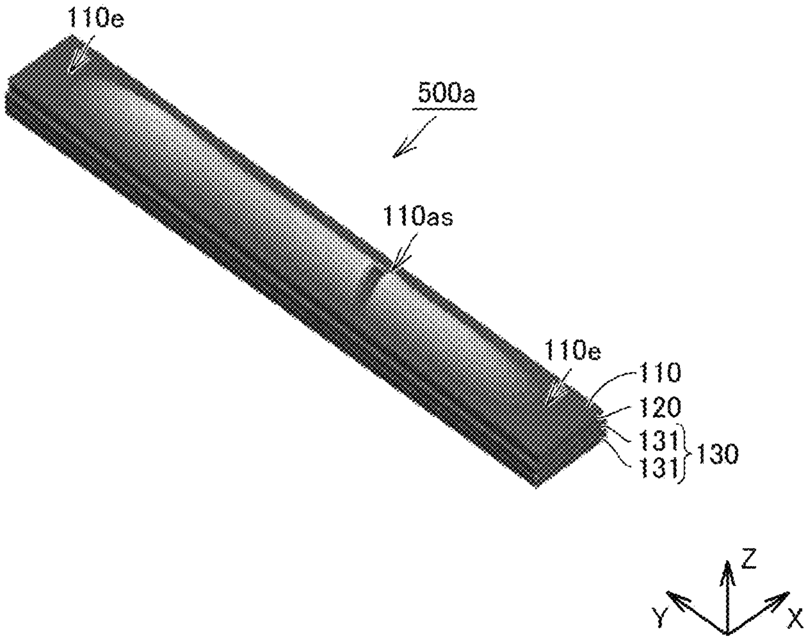
FIG. 35 is a perspective view showing a displacement state obtained by a simulation analysis using a finite element method when an ultrasonic transducer according to a modification of Example Embodiment 5 of the present invention is transmitting or receiving ultrasonic waves.

Note that the intermediate slit may be open at a position shifted from the center portion in the longitudinal direction inside the frame body 120. FIG. 35 is a perspective view showing a displacement state obtained by a simulation analysis using a finite element method when the ultrasonic transducer according to a modification of Example Embodiment 5 of the present invention is transmitting or receiving ultrasonic waves. As shown in FIG. 35, in an ultrasonic transducer 500*a* according to a modification of Example Embodiment 5 of the present invention, the intermediate slit 110*as* is provided in the first diaphragm 110 as a cavity that is open at a position shifted from a center portion toward an end portion in the longitudinal direction inside the frame body 120.

Example Embodiment 6

Hereinafter, an ultrasonic transducer according to Example Embodiment 6 of the present invention will be described with reference to the drawings. The ultrasonic transducer according to Example Embodiment 6 of the present invention is different from the ultrasonic transducer according to Example Embodiment 1 of the present invention in that a minimum dimension of the ultrasonic vibrator in the second direction (Y-axis direction) is smaller than a longitudinal dimension inside a frame body, and thus description of a configuration similar to that of the ultrasonic transducer according to Example Embodiment 1 of the present invention will not be repeated.

Figure 36:
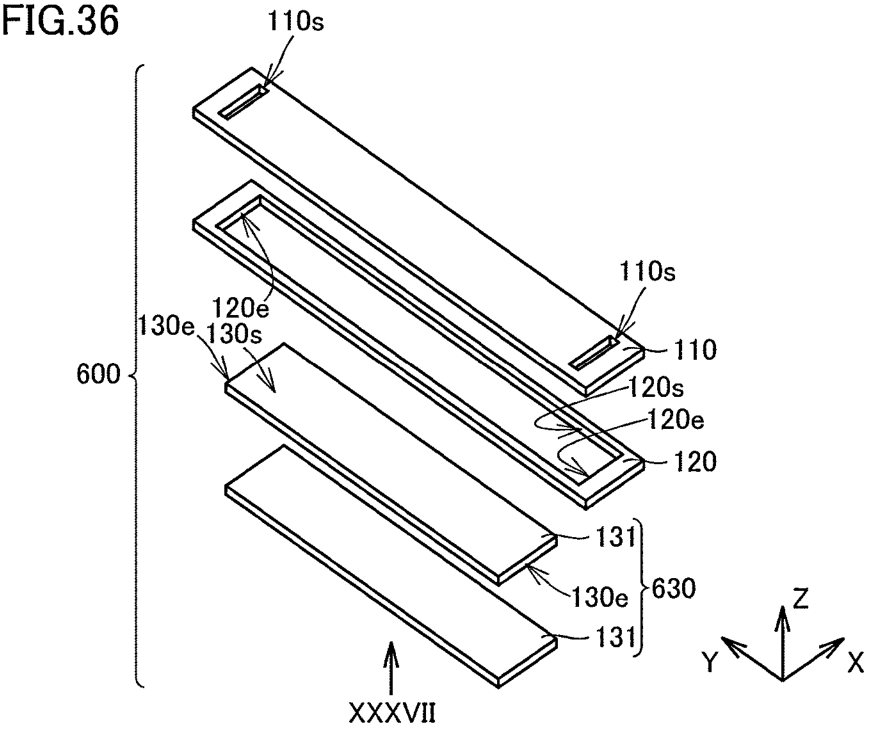
FIG. 36 is an exploded perspective view illustrating a configuration of an ultrasonic transducer according to Example Embodiment 6 of the present invention.

FIG. 36 is an exploded perspective view illustrating a configuration of the ultrasonic transducer according to Example Embodiment 6 of the present invention. As illustrated in FIG. 36, an ultrasonic transducer 600 according to Example Embodiment 6 of the present invention includes the first diaphragm 110, the frame body 120, and an ultrasonic vibrator 630.

Figure 37:
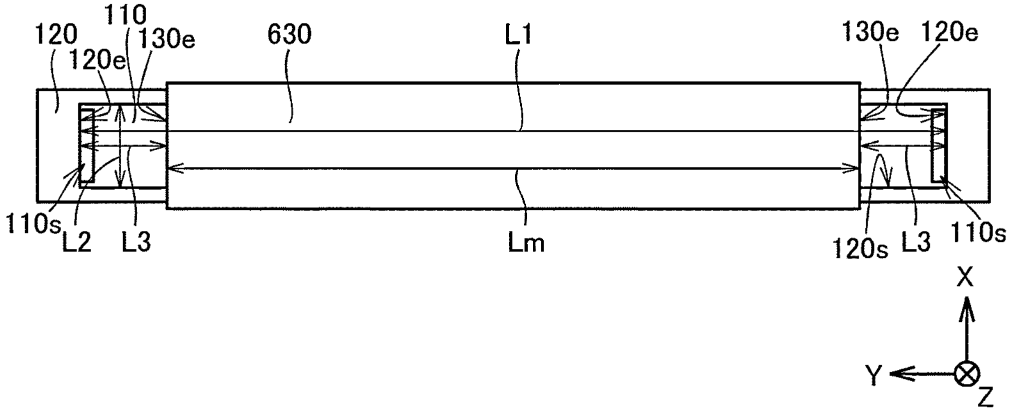
FIG. 37 is a diagram of the ultrasonic transducer illustrated in FIG. 36 as viewed in a direction of an arrow XXXVII.

FIG. 37 is a diagram of the ultrasonic transducer illustrated in FIG. 36 as viewed in a direction of an arrow XXXVII. As illustrated in FIG. 37, the ultrasonic vibrator 630 has a rectangular or substantially rectangular outer shape. The longitudinal dimension L1 in the second direction (Y-axis direction) inside the frame body 120 is greater than a minimum dimension Lm in the second direction (Y-axis direction) of the ultrasonic vibrator 630. Here, in a case where the ultrasonic vibrator 630 has a stacked structure in which a plurality of piezoelectric bodies are stacked, the minimum dimension Lm of the ultrasonic vibrator 630 in the second direction (Y-axis direction) is a minimum dimension of a piezoelectric body in the second direction (Y-axis direction) having a shortest length in the second direction (Y-axis direction) among the plurality of piezoelectric bodies. FIG. 37 illustrates the stacked structure in which the plurality of piezoelectric bodies are stacked without deviation in the second direction (Y-axis direction).

An average length L3 in the second direction (Y-axis direction) of a gap between an edge 120*e* on at least one side in the second direction (Y-axis direction) of an inner circumferential surface 120*s* of the frame body 120 and an edge 130*e* on the at least one side in the second direction (Y-axis direction) of a surface 130*s* of the ultrasonic vibrator 630 close to the frame body 120 illustrated in FIG. 36 is equal to or less than 1.3 times the short dimension L2 in the first direction (X-axis direction) inside the frame body 120.

In the present example embodiment, the average length L3 in the second direction (Y-axis direction) of a gap between the edge 120*e* on one side in the second direction (Y-axis direction) of the inner circumferential surface 120*s* of the frame body 120 and the edge 130*e* on the one side in the second direction (Y-axis direction) of the surface 130*s* of the ultrasonic vibrator 630 close to the frame body 120 is equal to or less than about 1.3 times the short dimension L2 in the first direction (X-axis direction) inside the frame 120, and the average length L3 in the second direction (Y-axis direction) of a gap between the edge 120*e* on another side in the second direction (Y-axis direction) of the inner circumferential surface 120*s* of the frame body 120 and the edge 130*e* on the other side in the second direction (Y-axis direction) of the surface 130*s* of the ultrasonic vibrator 630 close to the frame body 120 is equal to or less about 1.3 times the short dimension L2 in the first direction (X-axis direction) inside the frame body 120, for example.

Figure 38:
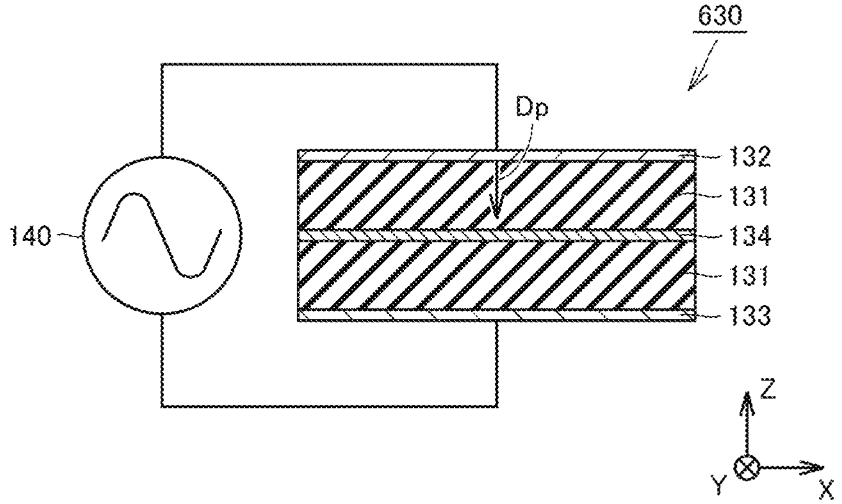
FIG. 38 is a sectional view illustrating a configuration of an ultrasonic vibrator included in the ultrasonic transducer according to Example Embodiment 6 of the present invention.

FIG. 38 is a sectional view illustrating a configuration of the ultrasonic vibrator included in the ultrasonic transducer according to Example Embodiment 6 of the present invention. As illustrated in FIG. 37, the ultrasonic vibrator 630 is attached to the frame body 120 and faces the first diaphragm 110 with a space in between. Specifically, the ultrasonic vibrator 630 is attached to another end of each of the pair of long side portions 121 of the frame body 120 in the third direction (Z-axis direction), and faces the first diaphragm 110 with an inner space of the frame body 120 in between.

As illustrated in FIG. 37 and FIG. 38, the ultrasonic vibrator 630 is a piezoelectric element including the piezoelectric body 131. As illustrated in FIG. 38, in the present example embodiment, the ultrasonic vibrator 630 includes a stacked structure in which a plurality of the piezoelectric bodies 131 are stacked. Specifically, the ultrasonic vibrator 630 includes the two stacked piezoelectric bodies 131. Of the two piezoelectric bodies 131, the piezoelectric body 131 in contact with the frame body 120 is polarized, and the piezoelectric body 131 not in contact with the frame body 120 is not polarized.

Figure 39:
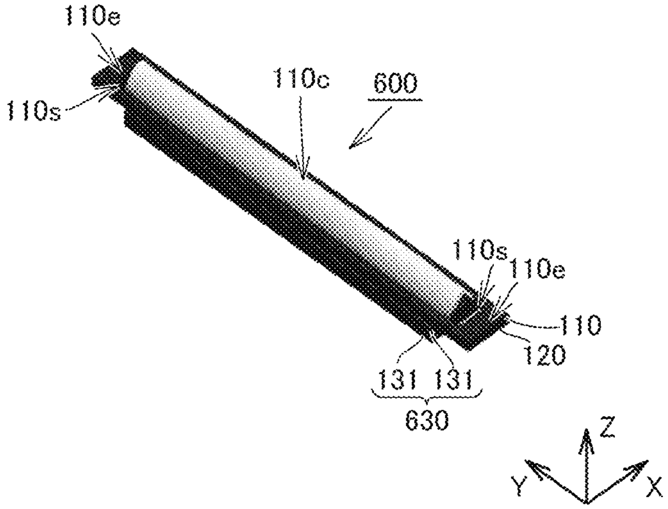
FIG. 39 is a perspective view showing a displacement state obtained by a simulation analysis using a finite element method when the ultrasonic transducer according to Example Embodiment 6 of the present invention is transmitting or receiving ultrasonic waves.

FIG. 39 is a perspective view showing a displacement state obtained by a simulation analysis using a finite element method when the ultrasonic transducer according to Example Embodiment 6 of the present invention is transmitting or receiving ultrasonic waves. As simulation analysis conditions, the thickness of the first diaphragm 110 was about 0.1 mm, the total thickness of the two piezoelectric bodies 131 was about 0.8 mm, the longitudinal dimension L1 inside the frame body 120 was about 20 mm, the short dimension L2 was 1.8 mm, and the thickness of the frame body 120 in the third direction (Z-axis direction) was about 0.4 mm, for example. The length dimension of the slit 110*s* in the first direction (X-axis direction) was about 80.1% of the short dimension L2 in the first direction (X-axis direction) inside the frame body 120, for example. The width dimension of the slit 110*s* in the second direction (the Y-axis direction) was about 0.5 mm, for example. The slit 110*s* extends from a position at an edge in the second direction (Y-axis direction) on an inner circumferential surface of the frame body 120 to a position inward by the width dimension in the second direction (Y-axis direction). The two slits 110*s* are open at both the respective end portions in the second direction (Y-axis direction) inside the frame body 120.

As illustrated in FIG. 39, in a vibration mode of the ultrasonic transducer 600 according to Example Embodiment 6 of the present invention, the first diaphragm 110 is structured to resonate and vibrate in a phase opposite to that of the ultrasonic vibrator 630 in the third direction (Z-axis direction) orthogonal to the first diaphragm 110. In the present example embodiment, the resonant frequency of the first diaphragm 110 and a resonant frequency of the ultrasonic vibrator 630 are about 150 kHz, for example.

In the present example embodiment, as illustrated in FIG. 37, the minimum dimension Lm of the ultrasonic vibrator 630 in the second direction (Y-axis direction) is less than the longitudinal dimension L1 in the second direction (Y-axis direction) inside the frame body 120 so that a gap is formed between the edge 120*e* on the at least one side of the inner circumferential surface 120*s* of the frame body 120 in the second direction (Y-axis direction) and the edge 130*e* on the at least one side of the surface 130*s* of the ultrasonic vibrator 630 illustrated in FIG. 36 close to the frame body 120 in the second direction (Y-axis direction). This makes it possible to reduce power consumption of the ultrasonic vibrator 630 and improve efficiency. In addition, since the piezoelectric body 131 which is not bonded to the frame body 120 is not driven, it is possible to reduce a free capacitance of a piezoelectric element and to efficiently displace the first diaphragm 110.

Here, a relationship between a ratio of the length dimension of the slit 110*s* in the first direction (X-axis direction) to the short dimension L2 in the first direction (X-axis direction) inside the frame body 120 and a rate of change in internal stress (value normalized per sound pressure) in the third direction (Z-axis direction) generated in the ultrasonic transducer will be described.

Figure 40:
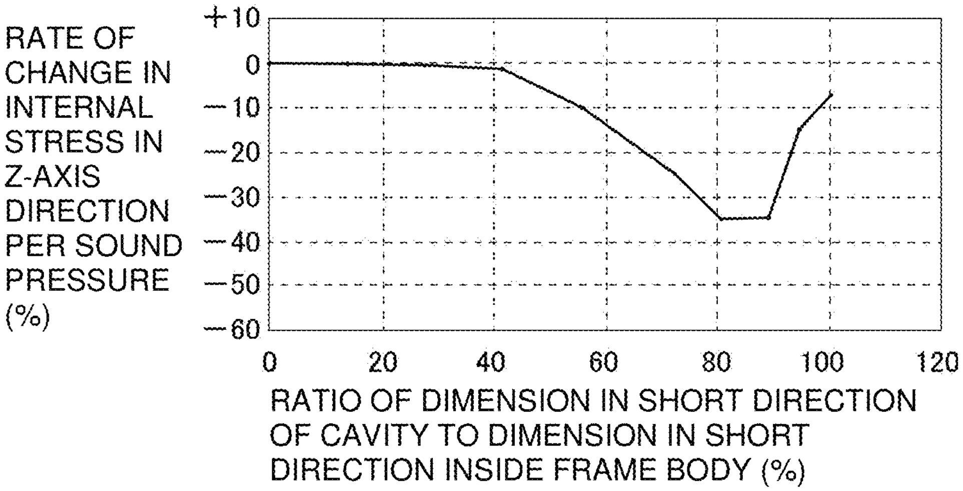
FIG. 40 is a graph obtained by a simulation analysis, using a finite element method, about a relationship between a ratio of a length dimension of the slit in the first direction (X-axis direction) to a short dimension in the first direction (X-axis direction) inside the frame body and a rate of change in the internal stress (value normalized per sound pressure) in the third direction (Z-axis direction) generated in the ultrasonic transducer.

FIG. 40 is a graph obtained by a simulation analysis, using a finite element method, about a relationship between the ratio of the length dimension of the slit in the first direction (X-axis direction) to the short dimension in the first direction (X-axis direction) inside the frame body and the rate of change in the internal stress (value normalized per sound pressure) in the third direction (Z-axis direction) generated in the ultrasonic transducer. In FIG. 40, a vertical axis represents the rate of change (%) in the internal stress in the third direction (Z-axis direction) per sound pressure, and a horizontal axis represents the ratio (%) of the length dimension of the slit 110*s* in the first direction (X-axis direction) to the short dimension L2 in the first direction (X-axis direction) inside the frame body 120. The rate of change in the internal stress in the third direction (the Z-axis direction) per sound pressure is a rate of change with respect to the internal stress in the third direction (the Z-axis direction) per sound pressure when the ratio of the length dimension of the slit 110*s* in the first direction (the X-axis direction) to the short dimension L2 in the first direction (the X-axis direction) inside the frame body 120 is 0%.

As shown in FIG. 40, when the ratio of the length dimension in the first direction (X-axis direction) of the slit 110*s* to the short dimension L2 in the first direction (X-axis direction) inside the frame body 120 is equal to or greater than about 60% and equal to or less than about 958, the rate of change in the internal stress in the third direction (the Z-axis direction) per sound pressure is equal to or greater than about-15%, for example. That is, when the dimension of the one or more cavities in the lateral direction is equal to or greater than about 60% and equal to or less than about 95% of the dimension in the lateral direction inside the one or more frame bodies, for example, the internal stress (value normalized per sound pressure) in the third direction (Z-axis direction) generated in the ultrasonic transducer 600 can be effectively reduced. Accordingly, it is possible to effectively reduce or prevent occurrence of cracks due to the internal stress in each of the bonding portion between the first diaphragm 110 and the frame body 120 and the bonding portion between the frame body 120 and the ultrasonic vibrator 630.

Next, a simulation analysis was performed using a finite element method about a relationship between a position of the first diaphragm 110 in the longitudinal direction (Y-axis direction) and displacement of the first diaphragm 110 in Sample 1 in which a ratio of the length dimension of the slit 110*s* in the first direction (X-axis direction) to the short dimension L2 in the first direction (X-axis direction) inside the frame body 120 was 0%, Sample 2 in which the ratio was 55.6%, Sample 3 in which the ratio was 77.8%, Sample 4 in which the ratio was 88.9%, and Sample 5 in which the ratio was 100%, for example.

Figure 41:
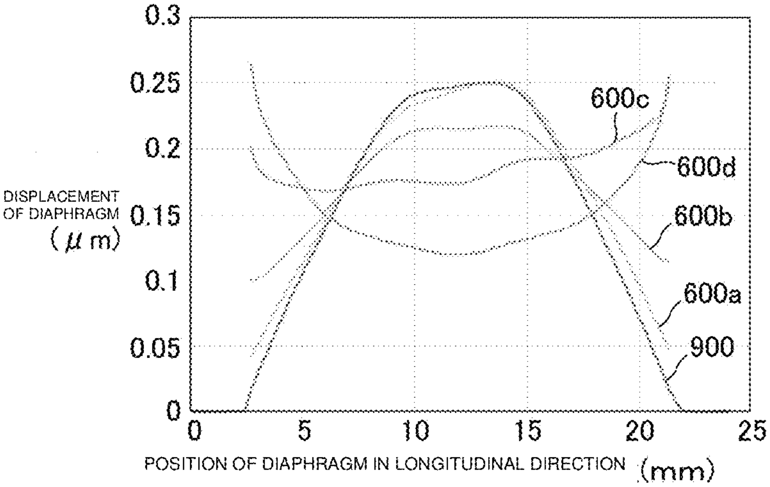
FIG. 41 is a graph obtained by a simulation analysis, using a finite element method, about a relationship between a position of a first diaphragm in the longitudinal direction (Y-axis direction) and displacement of the first diaphragm in each of Samples 1 to 5.

FIG. 41 is a graph obtained by a simulation analysis, using a finite element method, about a relationship between a position of the first diaphragm in the longitudinal direction (Y-axis direction) and displacement of the first diaphragm in Samples 1 to 5. In FIG. 41, a vertical axis represents the displacement (μm) of the first diaphragm, and a horizontal axis represents the position (mm) in the longitudinal direction (Y-axis direction) of the first diaphragm. A position of one edge of the first diaphragm 110 in the longitudinal direction (Y-axis direction) was defined as 0 mm, and a position of another edge of the first diaphragm 110 in the longitudinal direction (Y-axis direction) was defined as about 22 mm, for example.

Figure 42:
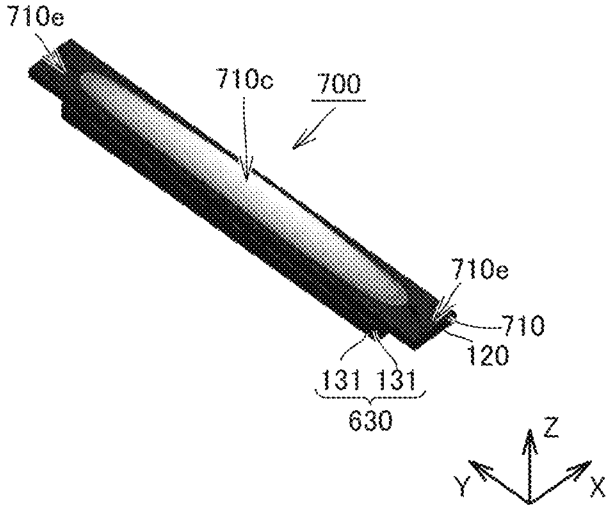
FIG. 42 is a perspective view showing a displacement state obtained by a simulation analysis using a finite element method when an ultrasonic transducer according to Sample 1 is transmitting or receiving ultrasonic waves.
Figure 43:
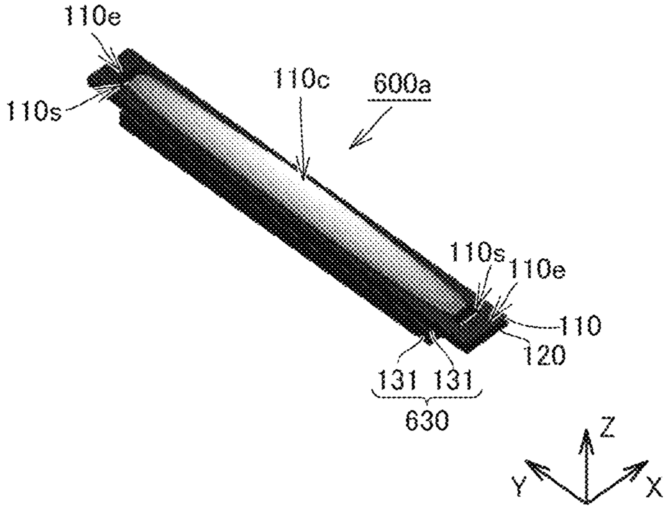
FIG. 43 is a perspective view showing a displacement state obtained by a simulation analysis using a finite element method when an ultrasonic transducer according to Sample 2 is transmitting or receiving ultrasonic waves.
Figure 44:
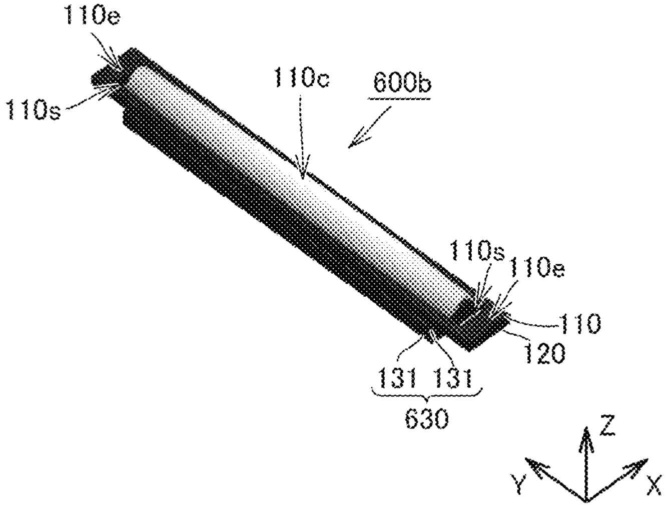
FIG. 44 is a perspective view showing a displacement state obtained by a simulation analysis using a finite element method when an ultrasonic transducer according to Sample 3 is transmitting or receiving ultrasonic waves.
Figure 45:
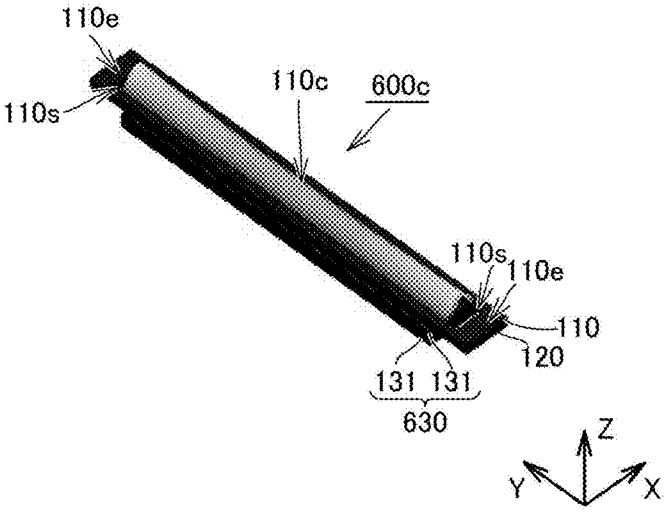
FIG. 45 is a perspective view showing a displacement state obtained by a simulation analysis using a finite element method when an ultrasonic transducer according to Sample 4 is transmitting or receiving ultrasonic waves.
Figure 46:
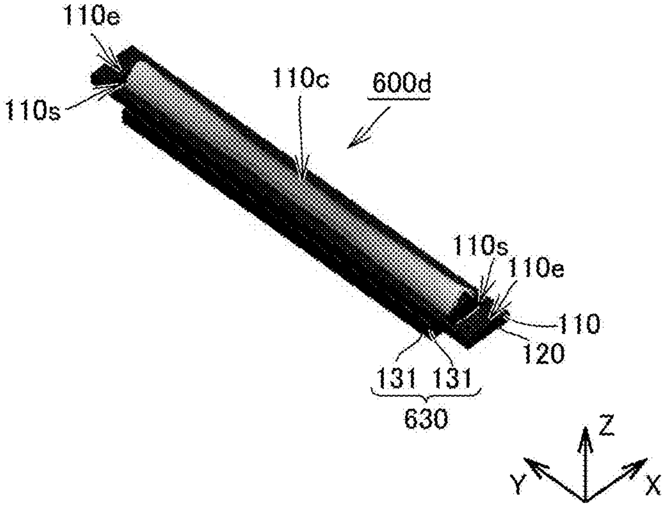
FIG. 46 is a perspective view showing a displacement state obtained by a simulation analysis using a finite element method when an ultrasonic transducer according to Sample 5 is transmitting or receiving ultrasonic waves.

FIG. 42 is a perspective view showing a displacement state obtained by a simulation analysis using a finite element method when an ultrasonic transducer according to Sample J is transmitting or receiving ultrasonic waves. FIG. 43 is a perspective view showing a displacement state obtained by a simulation analysis using a finite element method when an ultrasonic transducer according to Sample 2 is transmitting or receiving ultrasonic waves. FIG. 44 is a perspective view showing a displacement state obtained by a simulation analysis using a finite element method when an ultrasonic transducer according to Sample 3 is transmitting or receiving ultrasonic waves. FIG. 45 is a perspective view showing a displacement state obtained by a simulation analysis using a finite element method when an ultrasonic transducer according to Sample 4 is transmitting or receiving ultrasonic waves. FIG. 46 is a perspective view showing a displacement state obtained by a simulation analysis using a finite element method when an ultrasonic transducer according to Sample 5 is transmitting or receiving ultrasonic waves.

As shown in FIG. 41 and FIG. 42, in an ultrasonic transducer 700 according to Sample 1, in a first diaphragm 710, an intermediate portion 710*c* positioned at a middle in the longitudinal direction inside the frame body 120 was largely displaced, and the displacement became smaller as the position of the first diaphragm 710 was closer to an end portion 710*e* in the second direction (Y-axis direction).

As shown in FIG. 41 and FIG. 43, in an ultrasonic transducer 600*a* according to Sample 2, in the first diaphragm 110, the intermediate portion 110*c* positioned at a middle in the longitudinal direction inside the frame body 120 was largely displaced, and the displacement became smaller as the position of the first diaphragm 110 was closer to the slit 110*s* in the second direction (Y-axis direction).

As shown in FIG. 41 and FIG. 44, in an ultrasonic transducer 600*b* according to Sample 3, in the first diaphragm 110, the intermediate portion 110*c* was largely displaced, and the displacement became smaller as the position of the first diaphragm 110 was closer to the slit 110*s* in the second direction (Y-axis direction). However, in Sample 3, a difference between the displacement in the intermediate portion 110*c* and the displacement at a position in a vicinity of the slit 110*s* in a vibrating region was smaller as compared with Samples 1 and 2.

As shown in FIG. 41 and FIG. 45, in an ultrasonic transducer 600*c* according to Sample 4, in the first diaphragm 110, a position in a vicinity of the slit 110*s* in a vibrating region was displaced slightly more than the intermediate portion 110*c*.

As shown in FIG. 41 and FIG. 46, in an ultrasonic transducer 600*d* according to Sample 5, in the first diaphragm 110, a position in a vicinity of the slit 110*s* in a vibrating region was largely displaced, and the displacement became smaller as the position of the first diaphragm 110 was closer to the intermediate portion 110*c* in the second direction (Y-axis direction).

From the above results, it was discovered that a peak position of the displacement in the first diaphragm 110 shifts from the intermediate portion 110*c* to both end sides in the second direction (Y-axis direction) as the ratio of the length dimension in the first direction (X-axis direction) of the slit 110*s* to the short dimension L2 in the first direction (X-axis direction) inside the frame body 120 increases.

When the displacement of the first diaphragm 110 is uniformly distributed in the longitudinal direction of the frame body 120, maximum stress in the third direction (Z-axis direction) generated in the ultrasonic transducer during driving can be reduced. It is considered that, by this action mechanism, as shown in FIG. 40, when the ratio of the length dimension of the slit 110*s* in the first direction (X-axis direction) to the short dimension L2 in the first direction (X-axis direction) inside the frame body 120 is equal to or greater than about 60% and equal to or less than about 958, for example, the internal stress (value normalized per sound pressure) in the third direction (Z-axis direction) generated in the ultrasonic transducer 600 can be effectively reduced.

Note that when the ratio of the length dimension of the slit 110*s* in the first direction (X-axis direction) to the short dimension L2 in the first direction (X-axis direction) inside the frame body 120 is equal to or greater than about 60% and equal to or less than about 95%, for example, an effect of effectively reducing the internal stress (value normalized per sound pressure) in the third direction (Z-axis direction) generated in the ultrasonic transducer 600 can be similarly obtained in the transducers 100 and 200 according to respective Example Embodiment 1 and Example Embodiment 2.

In the description of the example embodiments described above, configurations that can be combined may be combined with each other.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer, comprising:

a first diaphragm;

one or more frame bodies extending in a longitudinal direction and bonded to the first diaphragm; and one or more ultrasonic vibrators attached to the respective one or more frame bodies and facing the first diaphragm with a space in between; wherein the first diaphragm is structured to resonate and vibrate in a direction orthogonal to the first diaphragm in a phase opposite to a phase of the one or more ultrasonic vibrators;

a dimension in the longitudinal direction inside the one or more frame bodies is larger than a dimension in a lateral direction orthogonal to the longitudinal direction inside the one or more frame bodies; and one or more cavities cause an external space on an opposite side from the one or more frame bodies with respect to the first diaphragm and an internal space inside the one or more frame bodies to communicate with each other.

2. The ultrasonic transducer according to claim 1, wherein the one or more cavities are in the first diaphragm.

3. The ultrasonic transducer according to claim 2, wherein each of the one or more cavities includes a slit extending in the lateral direction.

4. The ultrasonic transducer according to claim 3, wherein the one or more cavities extend to be equal to or larger than the dimension in the lateral direction inside the one or more frame bodies.

5. The ultrasonic transducer according to claim 1, wherein one cavity of the one or more cavities is open at one of both end portions in the longitudinal direction inside the one or more frame bodies.

6. The ultrasonic transducer according to claim 1, wherein two cavities of the one or more cavities are open at respective both end portions in the longitudinal direction inside the one or more frame bodies.

7. The ultrasonic transducer according to claim 1, wherein each of the one or more ultrasonic vibrators includes a piezoelectric element including a piezoelectric body.

8. The ultrasonic transducer according to claim 1, wherein the first diaphragm and the one or more ultrasonic vibrators have resonant frequencies equal to or higher than about 100 kHz.

9. The ultrasonic transducer according to claim 7, wherein a relationship of $0.25CpTp/Cv \leq Tv \leq 0.6CpTp/Cv$ is satisfied, where Cv is an acoustic velocity of a transverse wave of the first diaphragm, Cp is an acoustic velocity of a transverse wave of the piezoelectric body, Tv is a thickness dimension of the first diaphragm, and Tp is a thickness dimension of the piezoelectric body.

10. The ultrasonic transducer according to claim 7, wherein a relationship of $0.7CpTp/Cv \leq Tv \leq 1.3CpTp/Cv$ is satisfied, where Cv is an acoustic velocity of a transverse wave of the first diaphragm, Cp is an acoustic velocity of a transverse wave of the piezoelectric body, Tv is a thickness dimension of the first diaphragm, and Tp is a thickness dimension of the piezoelectric body.

11. The ultrasonic transducer according to claim 1, wherein the one or more frame bodies are aligned in the lateral direction and are bonded to the first diaphragm; and some of the one or more frame bodies adjacent to each other in the lateral direction are connected to each other at both end portions in the longitudinal direction.

12. The ultrasonic transducer according to claim 7, wherein the one or more ultrasonic vibrators are each a unimorph-type piezoelectric vibrator; and a second diaphragm is provided on a side of the piezoelectric body opposite to a frame body side.

13. The ultrasonic transducer according to claim 5, wherein the dimension in the longitudinal direction inside the one or more frame bodies is equal to or greater than twice the dimension in the lateral direction inside the one or more frame bodies.

14. The ultrasonic transducer according to claim 1, wherein a dimension of the one or more cavities in the lateral direction is equal to or greater than about 60% and equal to or less than about 95% of the dimension in the lateral direction inside the one or more frame bodies.

15. A parametric speaker, comprising the ultrasonic transducer according to claim 1; wherein an audible sound is reproducible by modulation driving of the ultrasonic transducer.

16. The parametric speaker according to claim 15, wherein the one or more cavities are in the first diaphragm.

17. The parametric speaker according to claim 16, wherein each of the one or more cavities includes a slit extending in the lateral direction.

18. The parametric speaker according to claim 17, wherein the one or more cavities extend to be equal to or larger than the dimension in the lateral direction inside the one or more frame bodies.

19. The parametric speaker according to claim 15, wherein one cavity of the one or more cavities is open at one of both end portions in the longitudinal direction inside the one or more frame bodies.

20. The parametric speaker according to claim 15, wherein two cavities of the one or more cavities are open at respective both end portions in the longitudinal direction inside the one or more frame bodies.

* * * * *